(12) United States Patent
Hayakawa

(10) Patent No.: US 10,904,473 B2
(45) Date of Patent: Jan. 26, 2021

(54) CONTROL METHOD

(71) Applicant: CANON KABUSHIKI KAISHA, Tokyo (JP)

(72) Inventor: Mizuki Hayakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/880,347

(22) Filed: Jan. 25, 2018

(65) Prior Publication Data

US 2018/0220098 A1 Aug. 2, 2018

(30) Foreign Application Priority Data

Jan. 31, 2017 (JP) ................. 2017-016207

(51) Int. Cl.

| *G06T 11/60* | (2006.01) |
|---|---|
| *H04N 1/387* | (2006.01) |
| *H04N 5/38* | (2006.01) |
| *H04N 7/025* | (2006.01) |
| *H04N 7/04* | (2006.01) |
| *H04N 5/14* | (2006.01) |

(52) U.S. Cl.
CPC ............. *H04N 5/38* (2013.01); *G06T 11/60* (2013.01); *H04N 1/387* (2013.01); *H04N 5/14* (2013.01); *H04N 7/0255* (2013.01); *H04N 7/04* (2013.01)

(58) Field of Classification Search
CPC ................................ G06T 11/60; H04N 1/387
See application file for complete search history.

(56) References Cited

U.S. PATENT DOCUMENTS

| 2006/0050337 A1* | 3/2006 | Hitaka ................... G06F 17/24 |
|---|---|---|
| | | 358/537 |
| 2008/0180711 A1* | 7/2008 | Ebuchi ................. H04N 1/2307 |
| | | 358/1.12 |
| 2010/0063961 A1* | 3/2010 | Guiheneuf ............. G06F 16/58 |
| | | 707/622 |
| 2010/0164992 A1* | 7/2010 | Akiya ................ H04N 1/00456 |
| | | 345/641 |
| 2010/0293157 A1* | 11/2010 | Ito ........................... G06F 16/58 |
| | | 707/723 |
| 2014/0158040 A1* | 6/2014 | Reichlin ................ B42D 9/004 |
| | | 116/234 |

FOREIGN PATENT DOCUMENTS

JP 2010-72934 A 4/2010

* cited by examiner

*Primary Examiner* — Yi Yang
(74) *Attorney, Agent, or Firm* — Canon U.S.A., Inc. IP Division

(57) ABSTRACT

As a solution to problems, provided is a control method including a display step of not executing display processing for displaying, on a display unit, a message indicating that there is an image that is not browsed when a non-layout image in a plurality of images indicated by layout information is not browsed and a layout image in the plurality of images indicated by the layout information is browsed, and executing the display processing when the layout image in the plurality of images indicated by the layout information is not browsed.

23 Claims, 25 Drawing Sheets

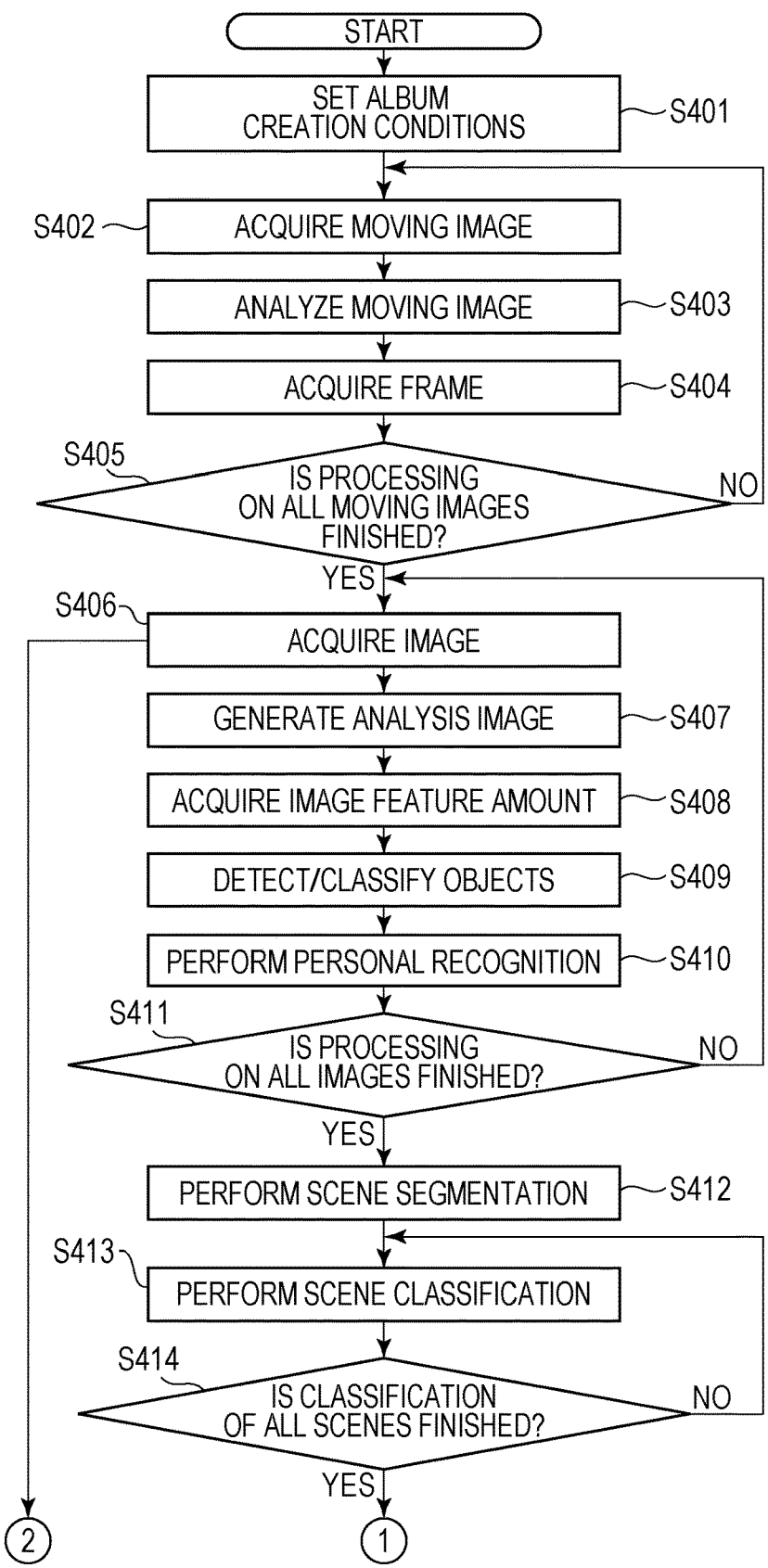

FIG. 5

| IMAGE ID (501) | SHOOTING DATE/TIME (502) | IMAGE ATTRIBUTE (503) | FOCUS (504) | OBJECT CLASSIFICATION (505) ||||||| NUMBER OF FACES (506) | IMAGE ID (507) |||||||
|---|---|---|---|---|---|---|---|---|---|---|---|---|---|---|---|---|
| | | | | TOP1 ||| TOP2 ||| TOP3 ||| | 1 || 2 || 3 ||
| | | | | CATEGORY | RELIABILITY | | CATEGORY | RELIABILITY | | CATEGORY | RELIABILITY | | | UPPER LEFT POSITION | LOWER RIGHT POSITION | UPPER LEFT POSITION | LOWER RIGHT POSITION | UPPER LEFT POSITION | LOWER RIGHT POSITION |
| 1 | 2015/7/1 10h11m12s | STILL IMAGE | ○ | PERSON | 90 | | – | – | | – | – | | 6 | 40, 40 | 65, 65 | 90, 40 | 115, 65 | 10, 20 | 25, 35 |
| 2 | 2015/7/1 10h12m30s | MOVING IMAGE | ○ | PERSON | 80 | | ANIMAL | 40 | | – | – | | 2 | 50, 100 | 100, 150 | 150, 125 | 190, 165 | 150, 125 | 190, 165 |
| 3 | 2015/7/1 10h15m54s | SNS | ○ | ANIMAL | 70 | | PERSON | 10 | | DISH | 5 | | 0 | – | – | – | – | – | – |
| ⋮ | ⋮ | | ⋮ | ⋮ | ⋮ | | ⋮ | ⋮ | | ⋮ | ⋮ | | ⋮ | ⋮ | ⋮ | ⋮ | ⋮ | ⋮ | ⋮ |

FIG. 7

| 701 | 702 SHOOTING PERIOD (TIME) | | 703 NUMBER OF CAPTURED IMAGES (NUMBER) | | 704 NUMBER OF PERSONS IN CAPTURED IMAGE (NUMBER) | |
|---|---|---|---|---|---|---|
| SCENE | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| EVERYDAY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG. 12

| DOUBLE-PAGE SPREAD NAME | IMPORTANCE LEVEL | BROWSING STATE |
|---|---|---|
| COVER | 2 | BROWSED |
| END LEAF 1 | 0 | NOT-BROWSED |
| FLY LEAF 1 (FRONT) | 0 | NOT-BROWSED |
| FLY LEAF 1 (BACK) | 0 | NOT-BROWSED |
| TITLE PAGE | 1 | NOT-BROWSED |
| 1-2 PAGES | 2 | NOT-BROWSED |
| 3-4 PAGES | 2 | NOT-BROWSED |
| 5-6 PAGES | 2 | NOT-BROWSED |
| 7-8 PAGES | 2 | NOT-BROWSED |
| 9-10 PAGES | 2 | NOT-BROWSED |
| COLOPHON | 1 | NOT-BROWSED |
| FLY LEAF 2 (FRONT) | 0 | NOT-BROWSED |
| FLY LEAF 2 (BACK) | 0 | NOT-BROWSED |
| END LEAF 2 | 0 | NOT-BROWSED |
| BACK COVER | 2 | BROWSED |

FIG. 14

| DOUBLE-PAGE SPREAD NAME | IMPORTANCE LEVEL | BROWSING STATE |
|---|---|---|
| COVER | 2 | BROWSED |
| END LEAF 1 | 0 | NOT-BROWSED |
| FLY LEAF 1 (FRONT) | 0 | NOT-BROWSED |
| FLY LEAF 1 (BACK) | 0 | NOT-BROWSED |
| TITLE PAGE | 1 | NOT-BROWSED |
| 1-2 PAGES | 2 | BROWSED |
| 3-4 PAGES | 2 | NOT-BROWSED |
| 5-6 PAGES | 2 | NOT-BROWSED |
| 7-8 PAGES | 2 | NOT-BROWSED |
| 9-10 PAGES | 2 | NOT-BROWSED |
| COLOPHON | 1 | NOT-BROWSED |
| FLY LEAF 2 (FRONT) | 0 | NOT-BROWSED |
| FLY LEAF 2 (BACK) | 0 | NOT-BROWSED |
| END LEAF 2 | 0 | NOT-BROWSED |
| BACK COVER | 2 | BROWSED |

FIG. 15

| DOUBLE-PAGE SPREAD NAME | IMPORTANCE LEVEL | BROWSING STATE |
|---|---|---|
| COVER | 2 | BROWSED |
| END LEAF 1 | 0 | BROWSED |
| FLY LEAF 1 (FRONT) | 0 | BROWSED |
| FLY LEAF 1 (BACK) | 0 | BROWSED |
| TITLE PAGE | 1 | BROWSED |
| 1-2 PAGES | 2 | BROWSED |
| 3-4 PAGES | 2 | BROWSED |
| 5-6 PAGES | 2 | BROWSED |
| 7-8 PAGES | 2 | BROWSED |
| 9-10 PAGES | 2 | BROWSED |
| COLOPHON | 1 | BROWSED |
| FLY LEAF 2 (FRONT) | 0 | BROWSED |
| FLY LEAF 2 (BACK) | 0 | BROWSED |
| END LEAF 2 | 0 | BROWSED |
| BACK COVER | 2 | BROWSED |

FIG. 23

|  | USER A | | USER B | |
| --- | --- | --- | --- | --- |
|  | IMPORTANCE LEVEL | BROWSING STATE | IMPORTANCE LEVEL | BROWSING STATE |
| COVER | 2 | BROWSED | 2 | NOT-BROWSED |
| FLY LEAF 1 | 0 | NOT-BROWSED | 0 | NOT-BROWSED |
| TITLE PAGE | 1 | NOT-BROWSED | 1 | NOT-BROWSED |
| 1-2 PAGES | 2 | NOT-BROWSED | 2 | NOT-BROWSED |
| 3-4 PAGES | 2 | NOT-BROWSED | 2 | NOT-BROWSED |
| 5-6 PAGES | 2 | NOT-BROWSED | 2 | NOT-BROWSED |
| 7-8 PAGES | 2 | NOT-BROWSED | 2 | NOT-BROWSED |
| 9-10 PAGES | 2 | NOT-BROWSED | 2 | NOT-BROWSED |
| COLOPHON | 1 | NOT-BROWSED | 1 | NOT-BROWSED |
| FLY LEAF 2 | 0 | NOT-BROWSED | 0 | NOT-BROWSED |
| BACK COVER | 2 | BROWSED | 2 | NOT-BROWSED |

FIG. 26

> THERE IS DOUBLE-PAGE SPREAD WHICH IS NOT BROWSED BY ASSOCIATE EDITOR.
> PRESSING OK WILL REQUEST ASSOCIATE EDITOR TO BROWSE NOT-BROWSED DOUBLE-PAGE SPREAD.
>
> OK

FIG. 27

> THERE IS DOUBLE-PAGE SPREAD WHICH IS NOT BROWSED BY ASSOCIATE EDITOR.
> PRESSING OK WILL ALLOW TO CONFIRM IF ASSOCIATE EDITOR WILL PLACE ORDER FOR IT.
>
> OK

CONTROL METHOD

BACKGROUND

Field of the Disclosure

The present disclosure relates to a control method.

Description of the Related Art

A method for generating layout information indicating a plurality of images including a layout image in which images represented by image data are arranged on a template has been heretofore known. Japanese Patent Laid-Open No. 2010-72934 discusses a method for automatically selecting a template and images to be arranged on the template, to thereby automatically generate information for creating an album.

Incidentally, for example, the images indicated by the layout information generated as discussed in Japanese Patent Laid-Open No. 2010-72934, may not be browsed by a user and the layout information may be directly transmitted to the outside. In this case, an output result with a low user satisfaction level may be obtained. Accordingly, when the images indicated by the layout information include an image that is not browsed by the user, control may be performed so as not to transmit the layout information to the outside by, for example, displaying an error screen. However, in such a configuration, control may be performed so as not to transmit the layout information to the outside even in a state where an image that is not necessarily required to be browsed by the user is not browsed by the user. Thus, the user is required to perform a troublesome operation.

Accordingly, there is a need for improving the usability in transmission of layout information to an outside, while preventing an acquisition of an output result with a low user satisfaction level.

SUMMARY

The present disclosure provides a control method for an image processing apparatus to process layout information indicating a plurality of images including a layout image in which a selected image represented by image data is arranged on a template, and a non-layout image on which text and the selected image are not arranged, the control method including:

a display step of not executing display processing for displaying, on a display unit, a message indicating that a not-browsed image is present, when the non-layout image in the plurality of images indicated by the layout information is not browsed and the layout image in the plurality of images indicated by the layout information is browsed, and executing the display processing when the layout image in the plurality of images indicated by the layout information is not browsed; and a transmission step of executing transmission processing for transmitting, when the message is displayed, the layout information to an outside of the image processing apparatus according to a user operation after the message is displayed.

A control method according to the present disclosure is a control method for causing a computer of an image processing apparatus to execute processing, the image processing apparatus being configured to process layout information indicating a plurality of images including a layout image including at least a content that varies depending on a content of setting information received from a user and a non-layout image not including the content, the processing including:

a display step of not executing display processing for displaying, on a display unit, a message indicating that a not-browsed image is present, when the non-layout image in the plurality of images indicated by the layout information is not browsed and the layout image in the plurality of images indicated by the layout information is browsed, and executing the display processing when the layout image in the plurality of images indicated by the layout information is not browsed; and a transmission step of executing transmission processing for transmitting, when the message is displayed, the layout information to an outside of the image processing apparatus according to a user operation after the message is displayed.

Further features of the present disclosure will become apparent from the following description of exemplary embodiments (with reference to the attached drawings).

BRIEF DESCRIPTION OF THE DRAWINGS

FIGS. 4, 4A, and 4B are flowcharts illustrating automatic layout processing executed by the album creation application according to one or more aspects of the present disclosure.

FIG. 5 is a table illustrating a table for managing image analysis information about image data according to one or more aspects of the present disclosure.

FIG. 7 is a diagram illustrating classification of scenes according to one or more aspects of the present disclosure.

FIG. 12 is a table illustrating browsing state management data according to one or more aspects of the present disclosure.

FIG. 14 is a table illustrating the browsing state management data according to one or more aspects of the present disclosure.

FIG. 15 is a table illustrating the browsing state management data according to one or more aspects of the present disclosure.

FIG. 23 is a table illustrating the browsing state management data according to one or more aspects of the present disclosure.

FIG. 26 is a diagram illustrating an error screen according to one or more aspects of the present disclosure.

FIG. 27 is a diagram illustrating a warning screen according to one or more aspects of the present disclosure.

DESCRIPTION OF THE EMBODIMENTS

Exemplary embodiments of the present disclosure will be described in detail below with reference to the accompanying drawings. The present disclosure described in the scope of claims is not limited by exemplary embodiments described below, and not all combinations of features described in the exemplary embodiments are essential to the solving means of the present disclosure.

In the following exemplary embodiments, a mode for causing an application program for creating an album (photo album or photo book) (the application program is hereinafter also referred to as an "album creation application") to operate on an image processing apparatus will be described. Images described below include, unless otherwise specified, a still image, a moving image, and a frame image in a moving image, as well as a still image, a moving image, and a frame image in a moving image on a social networking service (SNS).

First Exemplary Embodiment

Figure 24:
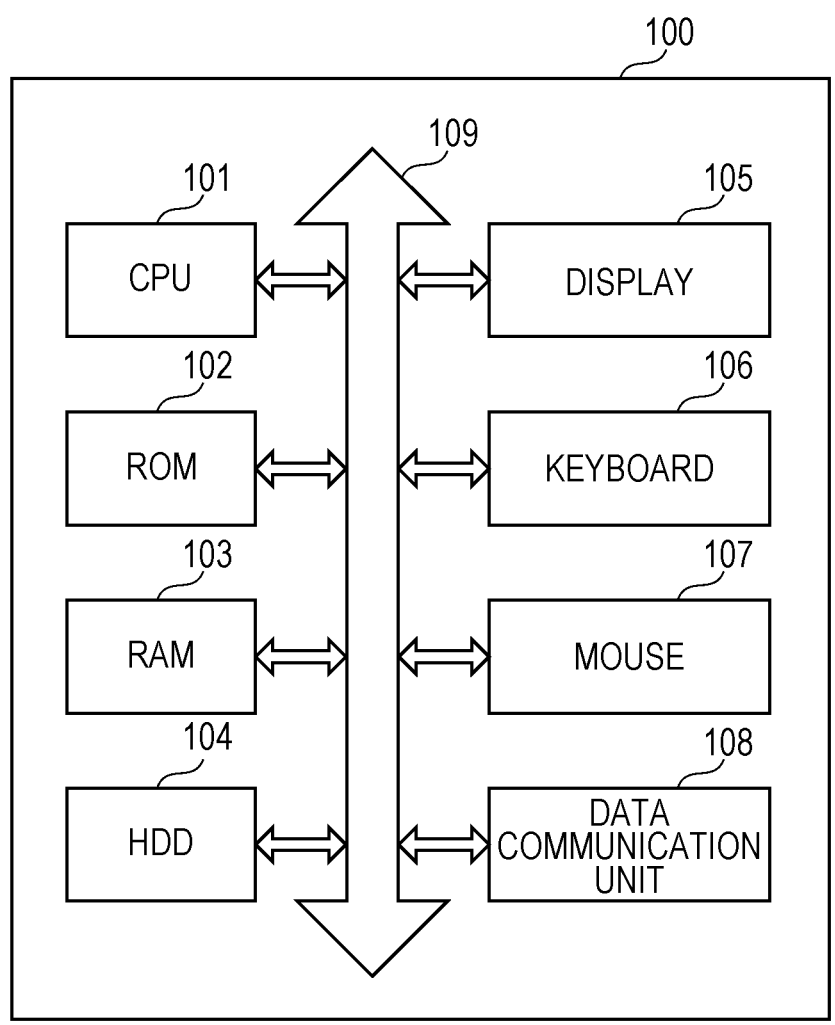
FIG. 24 is a block diagram illustrating a hardware configuration of the image processing apparatus according to one or more aspects of the present disclosure.

FIG. 24 is a block diagram illustrating a hardware configuration of an image processing apparatus 100 according to the present disclosure. Examples of the image processing apparatus include a personal computer (PC), a smartphone, a tablet terminal, a camera, and a printer. In the present exemplary embodiment, the image processing apparatus is a PC.

Referring to FIG. 24, an image processing apparatus 100 includes a CPU 101, a ROM 102, a RAM 103, an HDD 104, a display 105, a keyboard 106, a mouse 107, and a data communication unit 108. These are connected to each other via a data bus 109.

The central processing unit (CPU/processor) 101 is a system control unit and controls the overall image processing apparatus 100. The CPU 101 executes an image processing method described in the present exemplary embodiment according to a program. While one CPU is illustrated in the drawings, the number of CPUs is not limited to one. A plurality of CPUs may be provided.

The ROM 102 stores a program and an operating system (OS) to be executed by the CPU 101. The RAM 103 provides a memory for temporarily storing various types of information during execution of a program by the CPU 101. The hard disk (HDD) 104 is a storage medium for storing a database and the like to hold a result of processing such as analysis of an image file or an image. In the present exemplary embodiment, the RAM 103 stores an album creation application which is described below.

The display 105 (display unit) is a device that presents a user interface (UI) or an image layout result according to the present exemplary embodiment to a user. The display 105 may have a touch sensor function. The keyboard 106 is one of input devices and is used to, for example, input predetermined information on the UI displayed on the display 105. The predetermined information is, for example, information such as the number of double-page spreads or the number of pages of an album to be created. The mouse 107 is one of input devices and is used to, for example, click buttons on the UI displayed on the display 105. For example, the user double-clicks an icon which corresponds to the album creation application and is displayed on the display 105 by operating the mouse 107, thereby activating the album creation application.

The data communication unit 108 (communication unit) is a device for communicating with an external device such as a printer or a server. For example, data created by the album creation application is transmitted to the printer or server (not illustrated) which is connected to the image processing apparatus 100 via the data communication unit 108. The data communication unit 108 receives still image data on the server or SNS (social networking service) server (not illustrated). In the present exemplary embodiment, the data communication unit 108 receives the still image data from the SNS server, but also may receive moving image data.

The data bus 109 connects each unit (102 to 108) described above to the CPU 101.

Figure 1:
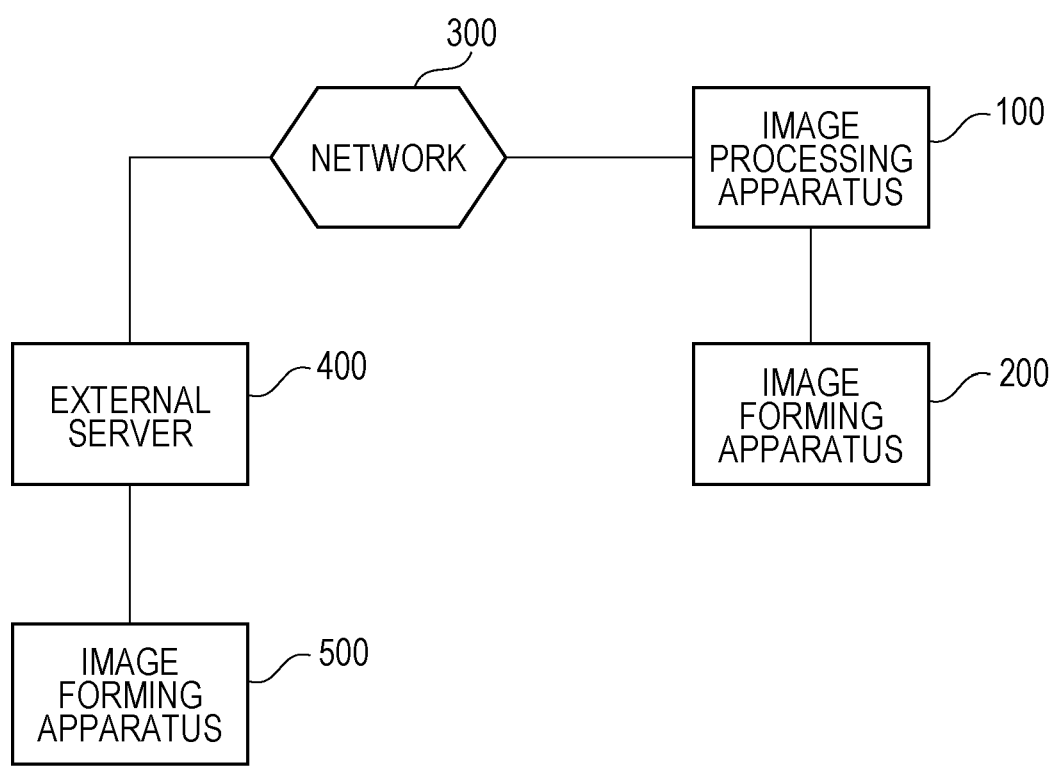
FIG. 1 is a diagram illustrating a configuration of a print system according to one or more aspects of the present disclosure.

FIG. 1 is a diagram illustrating a print system according to the present exemplary embodiment. Assume that this print system includes, in addition to the image processing apparatus 100, an image forming apparatus 200, a network 300, an external server 400, and an image forming apparatus 500.

The image forming apparatus 200 executes image formation processing (print processing) for forming an image on a recording medium using a recording material based on a print job received from the image processing apparatus 100 and the like. The present exemplary embodiment illustrates a configuration in which the image processing apparatus 100 transmits (outputs) the generated layout information to the external server. Alternatively, for example, a configuration in which the image processing apparatus 100 transmits the generated layout information to the image forming apparatus 200 as a print job may be employed. In this case, an album based on the layout information is created by the image forming apparatus 200.

The network 300 is a communication network that is connected to the image processing apparatus 100 and the external server 400 and is used to transmit information between the image processing apparatus 100 and the external server 400. The network 300 may be a wired network or a wireless network.

The external server 400 receives layout information, which is described below, from the image processing apparatus 100 via the network 300. That is, the external server 400 is a server for accepting orders and managing an album. After the user who operates the image processing apparatus 100 has completed an album purchase procedure, the external server 400 causes the image forming apparatus 500 to create an album based on the received layout information by image formation processing. After that, the album created by the image forming apparatus 500 is delivered to the user who has completed the album purchase procedure.

<Automatic Layout for Album>

Figure 2:
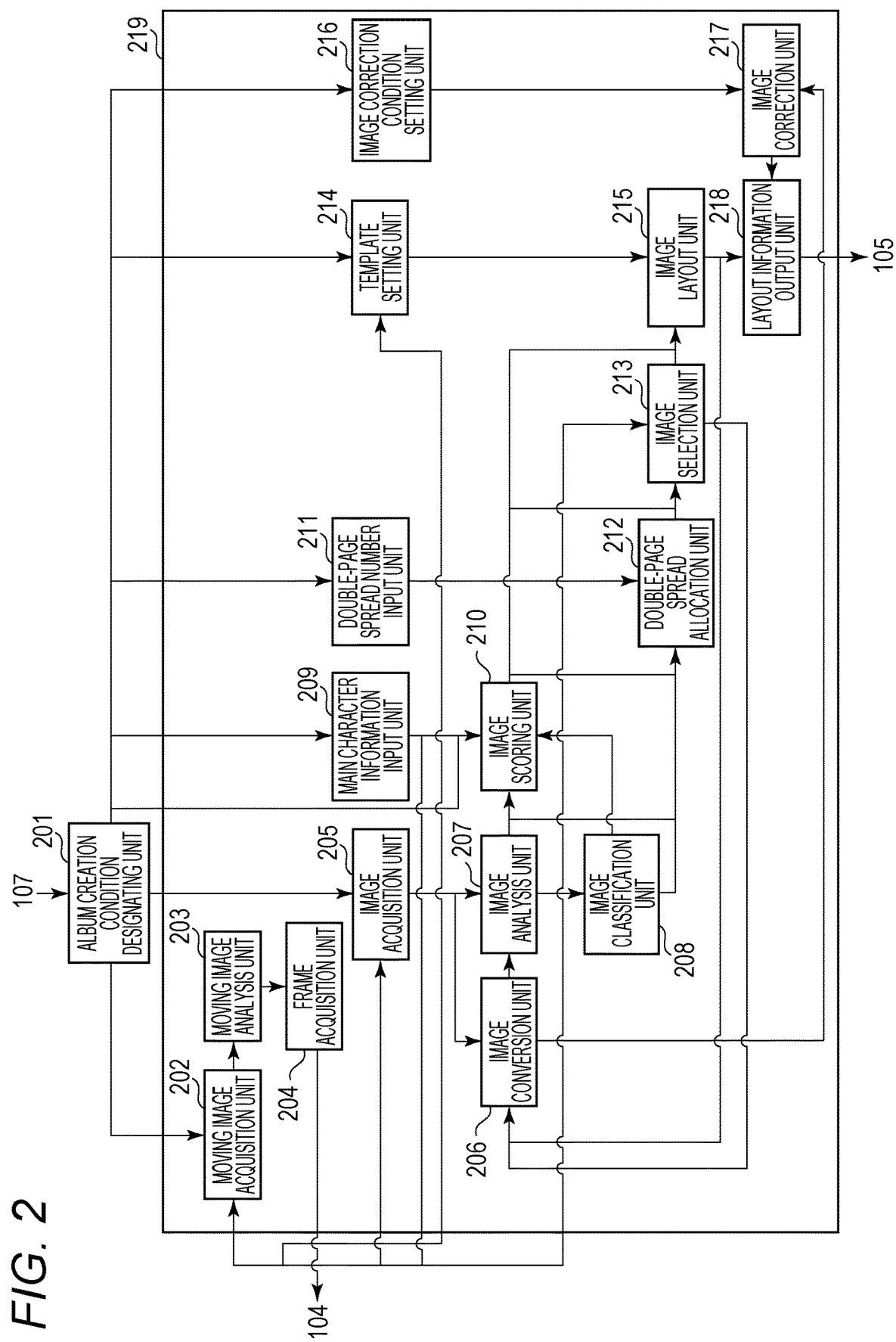
FIG. 2 is a block diagram illustrating a software configuration of an album creation application according to one or more aspects of the present disclosure.

FIG. 2 is a software block diagram illustrating an application program for creating an album (hereinafter referred to as an album creation application) according to the present exemplary embodiment. In the present exemplary embodiment, the album creation application stored in the HDD 104 is activated when the user double-clicks the icon which corresponds to the album creation application and is displayed on the display 105 by operating the mouse 107. The album creation application is installed from, for example, an external server via the data communication unit 108, and is then stored in the HDD 104.

The album creation application has various functions. However, in particular, an automatic layout function provided by the automatic layout processing unit 219 is herein described. The automatic layout function is a function for creating a layout image in which images represented by image data acquired by classifying and selecting a still image or a moving image based on the content or attribute thereof are arranged on a template prepared in advance. Thus, the automatic layout function is a function for generating layout information indicating the layout image. The user executes album ordering processing and the layout image displayed in this manner is output as an album.

As illustrated in FIG. 2, the album creation application includes an album creation condition designating unit 201 and an automatic layout processing unit 219.

Figure 3:
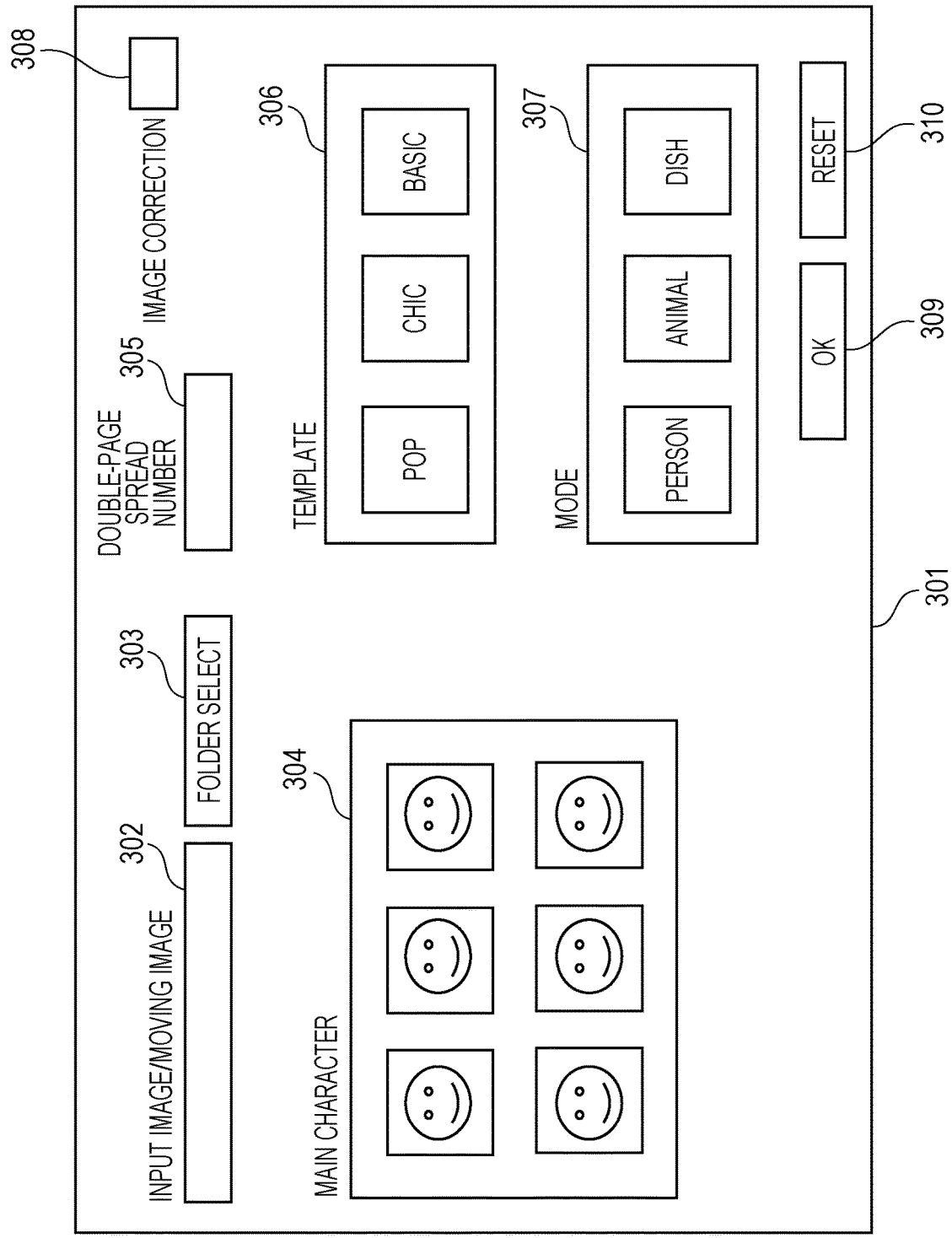
FIG. 3 is a diagram illustrating a setting screen displayed by an album creation application according to one or more aspects of the present disclosure.

The album creation condition designating unit 201 accepts, for example, the designation of album creation conditions corresponding to a UI operation, which is described below, using the mouse 107, and outputs the conditions to the automatic layout processing unit 219. The designated conditions include, for example, the range of image data to be processed, an ID of a main character, the number of double-page spreads of an album, template information, an ON/OFF condition for image correction, an ON/OFF condition for use of a moving image, and designation of an album mode. The range of image data to be processed is a range of image data representing images as candidate images to be arranged on a template. The designation of image data may be, for example, designation of accompanying information or attribute information of individual image data, such as shooting date/time, or designation based on a structure of a file system including the image data, such as designation of a device or directory (folder). A double-page spread corresponds to a pair of adjacent pages printed on different sheets (or pages). In the album creation application according to the present exemplary embodiment, assume that the layout of one double-page spread is created in one window for display. The album creation condition designating unit 201 displays, for example, a setting screen as illustrated in FIG. 3, and receives an input on the screen to thereby accept the designation of album creation conditions. A moving image analysis unit 203 extracts frames, which are clipped from the moving image data and managed in a chronological order, at predetermined intervals, and analyzes the frames. The moving image analysis unit 203 performs analysis processing, such as object detection, size specification, smile determination, eye closing determination, shaking/defocused state determination, or brightness determination, thereby making it possible to specify which one of the frames of a moving image is an excellent image.

A frame acquisition unit 204 clips frames from the moving image based on the result (evaluation) of analysis by the moving image analysis unit 203, and stores the clipped frames in the HDD 104 as image data.

An image acquisition unit 205 acquires, from a storage region, such as the HDD 104, an image group (image data group) designated by the album creation condition designating unit 201. The image acquisition unit 205 may acquire the image group from a storage region in a server or SNS server on a network via the data communication unit 108. The term "image group" used herein refers to a candidate of image data to be used for creating an album. For example, Jan. 1, XX to Dec. 31, XX may be designated as a condition for date/time when image data for layout is generated (when a picture corresponding to the image data is captured) (hereinafter referred to as shooting date/time) in the album creation condition designating unit 201. In this case, the image acquisition unit 205 acquires, as the image group, all pieces of image data generated from Jan. 1, XX to Dec. 31, XX.

The image data stored in the storage region is clipped image data acquired by cutting out frames from, for example, still image data or moving image data. The still image data and clipped image data are acquired from an image pickup device. The image pickup device may be included in the image processing apparatus 100, or may be included in an external apparatus (such as a PC, a smartphone, a digital camera, or a tablet terminal) of the image processing apparatus 100. In the case of acquiring the image data from the external apparatus, the image processing apparatus 100 acquires the image data via the data communication unit 108. Further, the image processing apparatus 100 may acquire the still image data or clipped image data from a network or server via the data communication unit 108. The CPU 101 analyzes data accompanying the image data and determines where each piece of the image data has been acquired.

An image conversion unit 206 converts information indicating the number of pixels of the image data or color information acquired by the image acquisition unit 205. The image conversion unit 206 preliminarily determines the type of pixel number information or color information to be converted, and the information is stored in the album creation application or a parameter file used by the album creation application. In the present exemplary embodiment, the image data acquired by the image acquisition unit 205 is converted into the image data in which the number of pixels is 420 pixels on a short side and the color information is represented in sRGB.

An image analysis unit 207 performs analysis processing on the image data. In the present exemplary embodiment, the image analysis unit 207 performs analysis processing on the image data converted by the image conversion unit 206. Specifically, the image analysis unit 207 acquires a feature amount from the converted image data, and executes object detection and face detection in the converted image data, recognition of the expression of the detected face, and personal recognition of the detected face. Further, shooting date/time information is acquired from data (e.g., Exif information) accompanying the non-converted image data acquired by the image acquisition unit 205. The shooting date/time information is not limited to information acquired from the Exif information, but instead information about date/time when the image data is created or updated may be used. Alternatively, information on date/time when the image data is uploaded to a local server or SNS server, or date/time when the image data is downloaded from a local server or SNS server may be used. Such date/time information is also treated as shooting date/time information in the following description. Assume that the local server is a storage region, such as the HDD 104, which is included in the image processing apparatus 100.

An image classification unit 208 executes scene segmentation and scene classification, which are described below, on the image data group by using the object detection results such as the shooting date/time information, the number of images, and the detected face information. The term "scene" refers to a shooting scene such as "travel", "everyday life", or "wedding". It can also be said that a scene is a set of pieces of image data generated for, for example, a temporal shooting opportunity.

A main character information input unit 209 inputs the identification information (ID) of the main character designated by the album creation condition designating unit 201 to an image scoring unit 210.

The image scoring unit 210 scores each piece of image data in such a manner that image data suitable for layout is given a high score. Scoring is executed according to the information obtained by the image analysis unit 207 and the information obtained by the image classification unit 208. Information other than the above-described information may be additionally or alternatively used. In the present exemplary embodiment, the image scoring unit 210 scores each piece of image data in such a manner that image data including the main character ID input from the main character information input unit 209 is given a high score.

A double-page spread number input unit 211 inputs the number of double-page spreads of the album designated by the album creation condition designating unit 201 to a double-page spread allocation unit 212.

The double-page spread allocation unit 212 makes an image group (grouping) and allocates the image group to each double-page spread. The double-page spread allocation unit 212 divides the image group according to the input number of double-page spreads, and allocates a part of the image group to each double-page spread.

An image selection unit 213 selects image data from the image group allocated to each double-page spread by the double-page spread allocation unit 212 based on the score given by the image scoring unit 210.

A template setting unit 214 reads, from the HDD 104, a plurality of templates according to the template information designated by the album creation condition designating unit 201, and inputs the plurality of templates to an image layout unit 215. Assume in the present exemplary embodiment that the plurality of templates is held in the album creation application stored in the HDD 104. The plurality of templates includes, for example, information about the size of the entire template, and information about the number, size, and position of slots included in the template.

The image layout unit 215 determines the layout of double-page spreads. Specifically, a template suitable for the image data selected by the image selection unit 213 is selected from the plurality of templates input by the template setting unit 214, and the position where each image is arranged is determined. Thus, the layout of double-page spreads is determined. The image data output from the layout information output unit 218 is displayed, for example, on the display 105 in a format illustrated in FIG. 13.

A layout information output unit 218 outputs layout information for displaying the layout image on the display 105 according to the layout determined by the image layout unit 215. The layout image is, for example, an image in which images represented by the image data selected by the image selection unit 213 are arranged on the selected template. The layout information is bitmap data representing the image.

An image correction unit 217 executes each of correction processing such as dodging correction (luminance correction), red-eye correction, and contrast correction. A correction condition input unit 216 inputs an ON/OFF condition for image correction designated by the album creation condition designating unit 201 to the image correction unit 217.

When the album creation application according to the present exemplary embodiment is installed in the image processing apparatus 100, an activation icon is generated on a top screen (desktop) displayed on the display 105 by the OS operating on the image processing apparatus 100. When the user double-clicks the activation icon by operating the mouse 107, a program for the album creation application stored in the HDD 104 is loaded into the RAM 103. The program loaded into the RAM 103 is executed by the CPU 101, so that the album creation application is activated.

FIG. 3 is a diagram illustrating an example of a UI configuration screen 301 provided by the activated album creation application. The UI configuration screen 301 is displayed on the display 105. When the user sets album creation conditions, which are described below, via the UI configuration screen 301, the album creation condition designating unit 201 acquires the setting content designated by the user. A path box 302 on the UI configuration screen 301 indicates a storage location (path) in the HDD 104 for an image/moving image group for which an album is created. A folder selection button 303 is clicked by operating the mouse 107 by the user, and folders including the image/moving image group for which an album is created are displayed in a tree structure so that the user can select the folders. The folder path including the image/moving image group selected by the user is displayed on the path box 302.

A main character designation icon 304 is an icon for designating a main character by the user, and a face image of a person is displayed as an icon. A person corresponding to the icon selected by a user operation is set as the main character in the album to be created. Further, the main character designation icon 304 is used to specify the main character as a central figure from among persons included in an image represented by the image data to be analyzed. The main character designation icon 304 indicates the, for example, face image of the person selected by the user, or the face image of the person determined by a method described below from among the face images of persons registered in a face database. The main character can also be automatically set by a procedure illustrated in FIGS. 4A and 4B. A double-page spread number box 305 accepts the setting about the number of double-page spreads of the album from the user. The user directly inputs a number to the double-page spread number box 305 via the keyboard 106, or inputs a number to the double-page spread number box from a list by using the mouse 107. The number of double-page spreads of an album corresponds to the number of images included in the plurality of images indicated by the layout information described below.

A template designation icon 306 displays an illustration image for each taste (pop, chic, etc.) of templates. A template corresponding to the icon selected by a user operation is set as a template used for an album to be created. In the present exemplary embodiment, a template includes an image arrangement frame (slot) for arranging image data. The image data is embedded into the slot included in the template, thereby completing one layout image.

A mode designation unit 307 is an icon corresponding to the album mode for creating an album. The album mode is a mode for laying out, on a template, images including a predetermined object. In an album of each mode, a larger number of objects corresponding to each mode are arranged. In the present exemplary embodiment, there are three modes of "person", "animal", and "dish". In other words, the album mode is, for example, a theme of an album. For example, when "animal" is selected as the album mode, images including an animal are laid out. A mode for laying out, on a template, image data representing images including objects other than the above-described three objects may be provided. A plurality of modes may be simultaneously selected. In this case, images including at least one of the plurality of objects corresponding to the plurality of selected modes are laid out on a template. The mode corresponding to the selected icon is set as the album mode for creating an album.

The album modes are not limited to the three modes described above. For example, other modes such as "building", "vehicle", and "flower" may be provided.

A check box 308 accepts the setting of ON/OFF for image correction from the user. An OK button 309 is a button for accepting the completion of the setting from the user. When the OK button 309 is pressed by the user, the album creation condition designating unit 201 outputs pieces of setting information set on a screen 301 to modules respectively corresponding to the pieces of setting information in the automatic layout processing unit 219.

A reset button 310 is a button for resetting each piece of setting information on the UI configuration screen 301.

On the UI configuration screen 301, settings other than the above-described settings can be executed. For example, a setting about a moving image, or a setting about a location where image/moving image data is acquired can be executed. In addition, for example, a setting about the number of images to be arranged on a template can be executed.

A server name box indicates the name of a server including an image group, or the name of SNS used for creating an album. When log-in to the designated server or SNS is completed by a user operation via a log-in screen, the CPU 101 can acquire image data from the designated server or SNS.

A moving image use check box accepts, from the user, a setting as to whether to use a folder designated in the path box 302, or a moving image on the server or SNS designated in the server name box for creating an album.

A target period box accepts, from the user, a setting about a shooting date/time condition for an image group or moving image group for which an album is created.

Figure 4B:
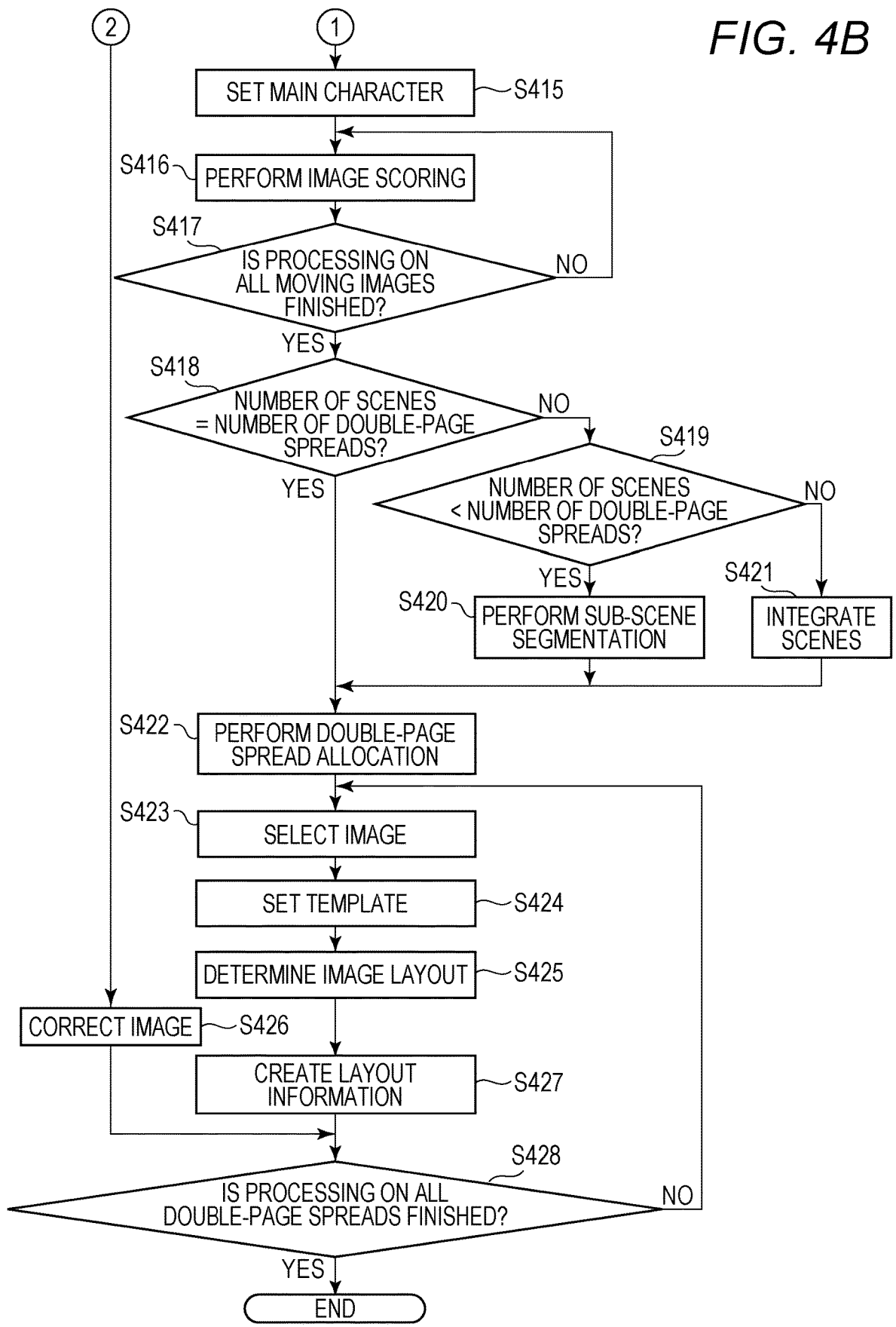

FIGS. 4A and 4B are flowcharts illustrating automatic layout processing to be executed by the album creation application according to the present exemplary embodiment. The flowcharts illustrated in FIGS. 4A and 4B are implemented in such a manner that, for example, the CPU 101 retrieves the program corresponding to the album creation application stored in the HDD 104 into the ROM 102 or RAM 103 and executes the program. The automatic layout processing will be described with reference to FIGS. 4A and 4B. As described below, in the present exemplary embodiment, in the case of creating an album, the image group for creating an album is divided according to a shooting time, and images to be arranged on pages are selected from each sub-image group obtained by the division.

First, in S401, the CPU 101 sets album creation conditions. Specifically, for example, the setting of album creation conditions is accepted from the user via the screen illustrated in FIG. 3.

In S402, the CPU 101 causes a moving image acquisition unit 202 to acquire moving image data included in the storage region to be searched.

In S403, the CPU 101 causes the moving image analysis unit 203 to analyze the moving image data acquired in S402.

In S404, the CPU 101 causes the frame acquisition unit 204 to clip frames from the moving image data analyzed in S403, and stores the clipped frames in the HDD 104 as image data.

In S405, the CPU 101 determines whether the processing in S402 to S404 has been finished on all pieces of moving image data included in the storage region to be searched. When the processing has not been finished yet (No in S405), the processing returns to S402, and moving image data which is not subjected to the processing is acquired. When the processing has been finished (Yes in S405), the processing proceeds to S406.

In S406, the CPU 101 causes the image acquisition unit 205 to acquire image data included in the storage region to be searched.

In S407, the CPU 101 converts the image data by the image conversion unit 206.

In S408, the CPU 101 causes the image analysis unit 207 to acquire a feature amount from the image data converted in S407.

In S409, the CPU 101 causes the image analysis unit 207 to execute object detection processing on the image data converted in S407. First, the CPU 101 detects a face of a person from images represented by the image data converted in S407. Further, the CPU 101 extracts a face image and acquires the upper left coordinate value and the lower right coordinate value of the position of the detected face image. The obtainment of the two types of coordinates enables the CPU 101 to acquire the position of the face image and the size of the face image. The CPU 101 executes face detection processing using Adaboost, thereby making it possible to acquire information about the reliability of each detected object. The reliability will be described in detail below. In S409, the CPU 101 may create a strong discriminator with Adaboost by using an object, such as animals including a dog and a cat, flower, dish, building, ornament, or vehicle, as well as human faces, as a detection target. With this configuration, the CPU 101 can detect objects other than human faces. In the present exemplary embodiment, in S409, the CPU 101 executes not only the face detection processing, but also processing for detecting an animal and dish.

In S410, the CPU 101 causes the image analysis unit 207 to execute personal recognition processing. The CPU 101 specifies a person corresponding to a representative face image having a similarity equal to or higher than a threshold and having a highest similarity as a person corresponding to the face image extracted in S409. When the similarity between the face image extracted in S409 and all representative face images stored in a face dictionary database is less than the threshold, the CPU 101 allocates a new personal ID to the extracted face image, and registers the face image as a new person in the face dictionary database.

Image analysis information about each piece of image data acquired in S408 to S410 is associated with image IDs 501 for discriminating each piece of image data and is stored in the storage region such as the RAM 103 or the HDD 104. For example, as illustrated in FIG. 5, shooting date/time information 502 acquired in S408 and a focus discrimination result 504, and the number 506 of face images detected in S409 and positional information 507 are stored in a table format.

An image attribute 503 represents an attribute of each piece of image data. For example, image data, which is still image data acquired from a local server, has a "still image" attribute. For example, image data which is clipped from the moving image data acquired from the local server and stored has a "moving image" attribute. For example, image data acquired from an SNS server has an "SNS" attribute.

An object classification 505 represents the categories (types) of each object included in an image represented by each piece of image data, and the reliability of each category.

Assume in the present exemplary embodiment that three categories (types) of objects, i.e., "person", "animal", and "dish", are detected, and the object classification 505 stores information indicating the category of each object detected in the image represented by each piece of image data. In other words, the object classification 505 is information indicating the category of each object in the image represented by each piece of image data. The information may be managed by, for example, a flag. As described above, the category of each object to be detected is not limited to the three categories of "person", "animal", and "dish". Accordingly, the object classification 505 may store, for example, information indicating categories such as "flower", "building", "ornament", and "vehicle".

The reliability of each category is information indicating the category to which each object included in an image represented by image data is likely to belong. A category with a higher reliability indicates the category to which an object included in an image represented by image data is likely to belong.

In S411, the CPU 101 determines whether the processing in S407 to S410 has been finished on all pieces of image data included in the storage region to be searched.

Figure 6A:
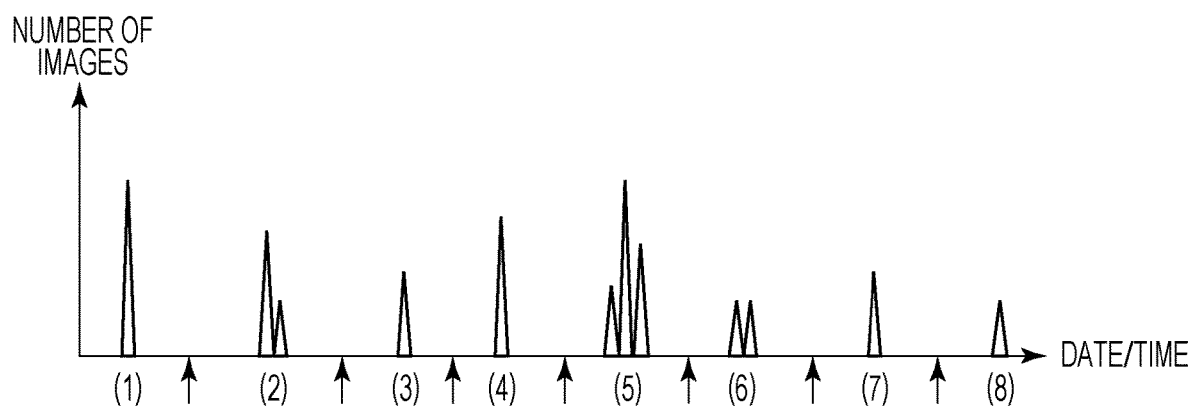
FIGS. 6A to 6C are graphs each illustrating grouping of an image data group according to one or more aspects of the present disclosure.
Figure 6B:
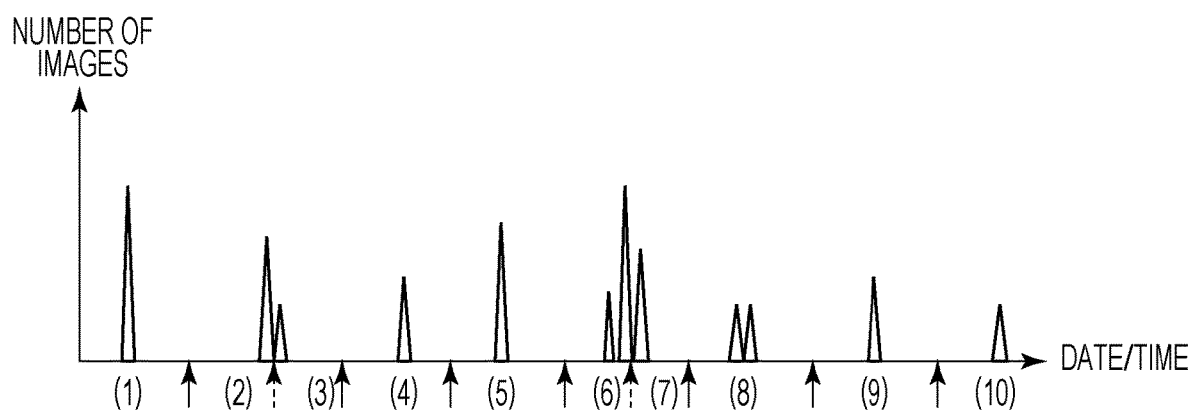
Figure 6C:
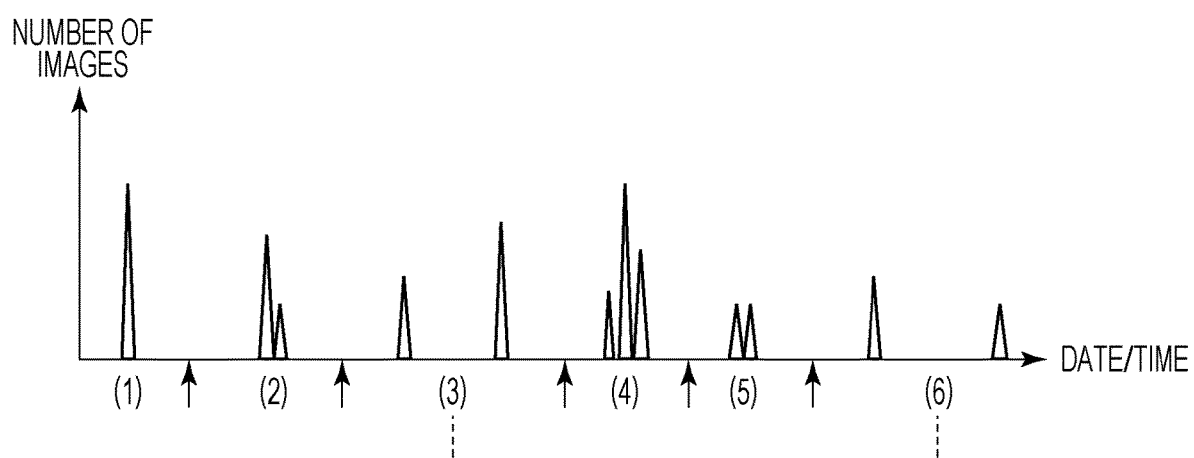

In S412, the CPU 101 causes the image classification unit 208 to perform scene segmentation. The term "scene segmentation" refers to management of all pieces of image data obtained in S401 to S411 by grouping the pieces of image data for each scene and managing the pieces of image data as a plurality of image groups. In the following description, each image group obtained by grouping all pieces of image data (main image group) is referred to as a sub-image group. FIG. 6A illustrates an example of grouping of captured image data. In FIGS. 6A to 6C, the horizontal axis represents shooting date/time (time proceeds from left to right), and the vertical axis represents the number of pieces of captured image data. In FIG. 6A, the captured image data group is divided into eight sub-image groups (groups) of groups 601 to 608. Each arrow in FIG. 6A indicates a boundary between groups.

In S413, the CPU 101 causes the image classification unit 208 to perform scene classification. Specifically, the CPU 101 scores the sub-image groups obtained by the scene segmentation in S412 for each type of scenes, and classifies the type of the scene with a highest score as the sub-image group. In the following description, scoring in S413 is referred to as scene classification scoring. Assume in the present exemplary embodiment that there are scene types of "travel", "everyday life", and "ceremony", and the sub-image groups are classified as one of these scene types. The scene classification scoring uses a scene classification table in which information about the feature amounts corresponding to the respective scene types is stored.

Assume in the present exemplary embodiment that a table 700 illustrated in FIG. 7 is used as the scene classification table. In the table 700, an average value and a standard deviation for each of a shooting period 702, the number of captured images 703, and the number of persons 704 in the captured image are registered in association with a scene ID 701

In S414, the CPU 101 determines whether the scene classification in S413 on all sub-image groups acquired in S412 has been finished. When the scene classification has not been finished (No in S414), the processing returns to S413, and the scene classification is performed on sub-image groups which are not subjected to the scene classification.

In S415, the CPU 101 causes the image scoring unit 210 to perform main character setting. The main character setting is executed on the image group designated by the user and is executed by one of two setting methods, i.e., an automatic setting method and a manual setting method.

In S416, the CPU 101 causes the image scoring unit 210 to perform image scoring processing. The image scoring processing in S416 is giving a score (scoring) by evaluating each piece of image data from the viewpoints described below, and the score is referred to when image data representing images to be arranged on a template is selected. The scoring method will now be described with reference to FIGS. 8 and 10.

Figure 10:
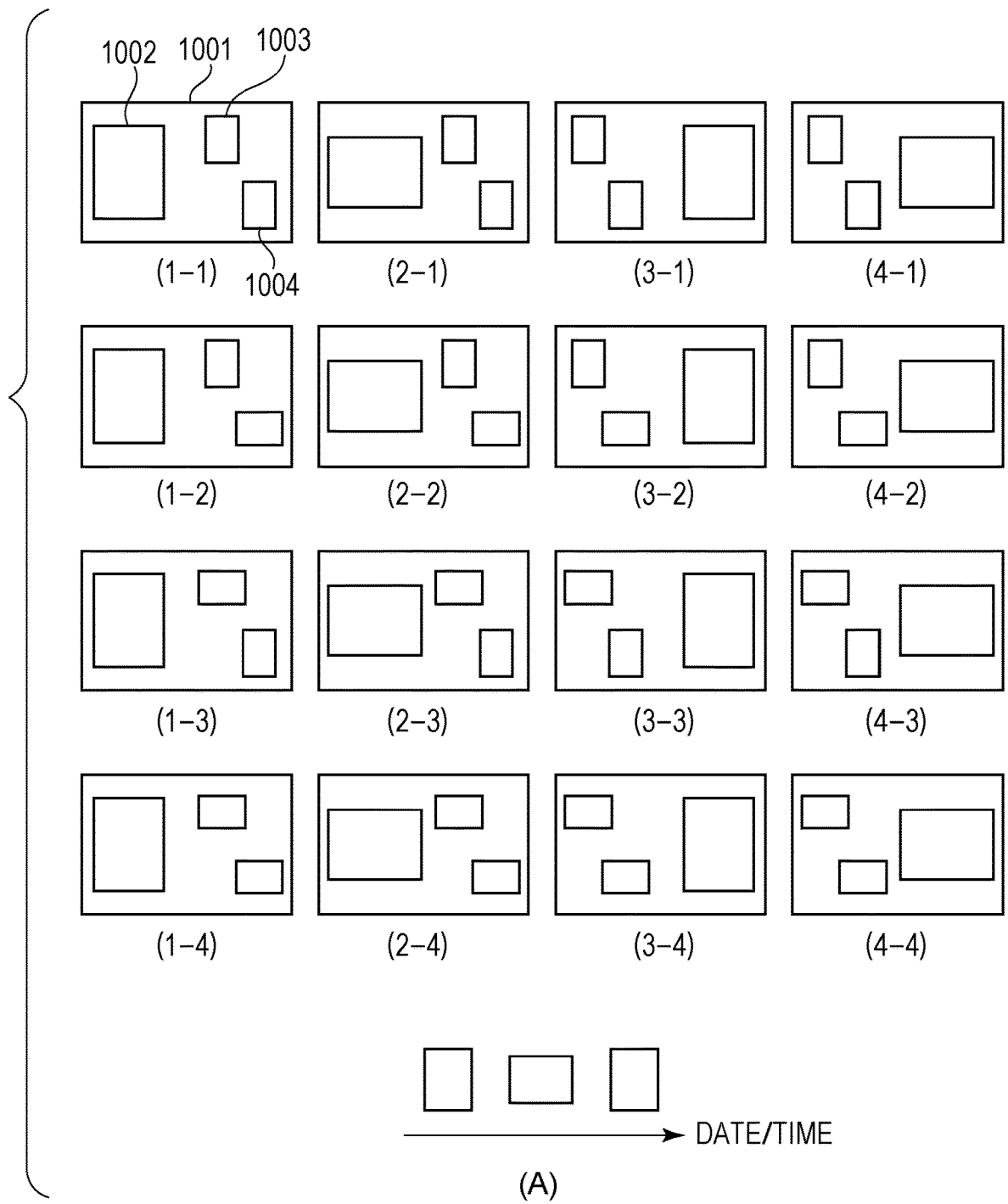
FIG. 10 is a diagram illustrating a layout of image data according to one or more aspects of the present disclosure.

FIG. 10 illustrates a template group used for layout of image data. A plurality of templates included in the template group corresponds to double-page spreads, respectively. A template 1001 is one template. A main slot 1002 indicates a main slot. Sub-slots 1003 and 1004 indicate sub-slots. The main slot 1002 is a main slot (frame for laying out (arranging) images) in the template 1001, and has a size larger than that of the sub-slots 1003 and 1004. In S416, the CPU 101 performs, as image scoring processing, processing for giving a score for the main slot corresponding to the scene of the type to which image data belongs, and a score for sub-slots to the image data.

In the image scoring processing, a slot feature table in which information about the feature amount of images to be adopted for each of the main slot and sub-slots is stored for each scene type is used. Accordingly, scoring for both the main slot and sub-slots is executed on the image data. In the present exemplary embodiment, the CPU 101 adds a score to the score calculated as described above based on the mode designated by the album creation condition designating unit 201. Specifically, for example, the CPU 101 adds scores according to the mode designated by the mode designation unit 307 and the result of object classification of pieces of image data.

The CPU 101 performs the image scoring processing on the pieces of image data in the image data group designated by the user. The score added by the image scoring processing is used as a selection criterion in image selection processing at the subsequent stage of S423. With this configuration, in the image selection processing described below, the CPU 101 can select image data representing images including an object of the category corresponding to the album mode in preference to image data representing images that do not include the object.

Figure 8:
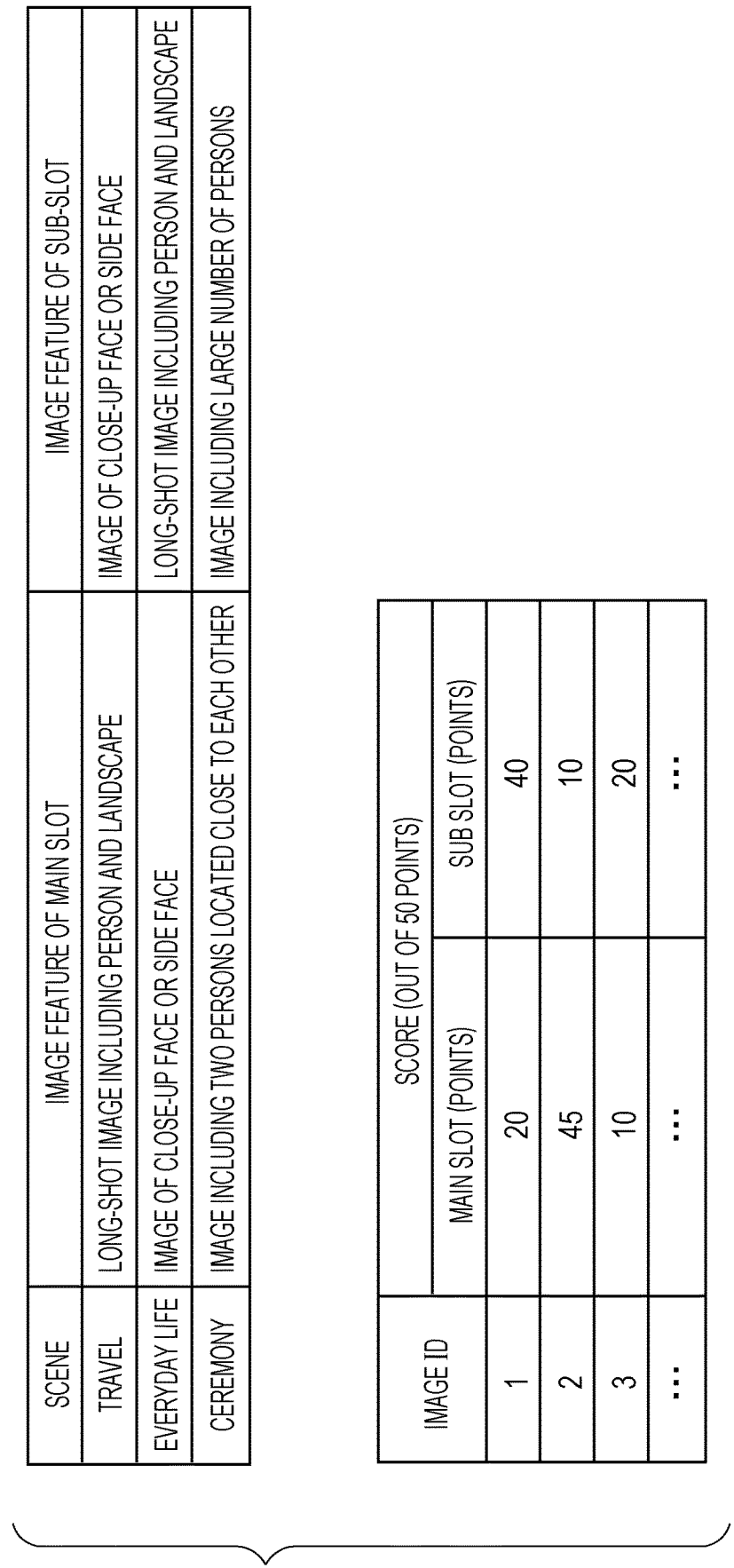
FIG. 8 is a diagram illustrating scoring of a main slot and a sub-slot according to one or more aspects of the present disclosure.

FIG. 8 illustrates an example of scoring results by layout scoring. For example, an image ID1 is given 20 points for the main slot. An image ID2 is given 45 points for the main slot. This indicates that the image ID2 is closer to the user's determination criterion for the main slot.

In S417, the CPU 101 determines whether the image scoring processing in S416 on all pieces of image data acquired by the image acquisition unit 205 has been finished. When the processing has not been finished (No in S417), the processing returns to S416, and the image scoring processing on the image data which is not subjected to the processing is executed.

In S418, the CPU 101 determines whether the number of scenes (the number of sub-image groups) obtained by the scene segmentation in S412 is equal to the number of double-page spreads (the number of double-page spreads input to the double-page spread number box 305) input by the double-page spread number input unit 211.

In S419, the CPU 101 causes the double-page spread allocation unit 212 to determine whether the number of scenes obtained by the scene segmentation in S412 is smaller than the number of double-page spreads input by the double-page spread number input unit 211.

In S420, the CPU 101 causes the double-page spread allocation unit 212 to perform sub-scene segmentation. The term "sub-scene segmentation" refers to further dividing each scene obtained by the scene segmentation when the scene segmentation number<the number of double-page spreads.

In S421, the CPU 101 causes the double-page spread allocation unit 212 to integrate the scenes. Integrating the scenes indicates that the grouped scenes (sub-image groups) are integrated when the scene segmentation number>the number of double-page spreads of the album. Specifically, the CPU 101 integrates scenes so that the number of scenes matches the number of double-page spreads. A case where the scene segmentation number is 8 and the number of designated double-page spreads is 6 as illustrated in FIG. 6A will now be described by way of example. FIG. 6C illustrates the result of integrating scenes in FIG. 6A. The front and back scenes at a location corresponding to a broken line are integrated and thus the grouping number is set to 6.

In S422, the CPU 101 causes the double-page spread allocation unit 212 to perform double-page spread allocation processing. In S418 to S421, the number of sub-image groups is equal to the number of designated double-page spreads. In the present exemplary embodiment, the shooting date/time is allocated to the top of the double-page spread from the first sub-image group. Specifically, the sub-image groups are allocated to the pages of each double-page spread in the order of shooting date/time. Thus, the album in which sub-image groups are arranged in the order of shooting date/time can be created.

Figure 9:
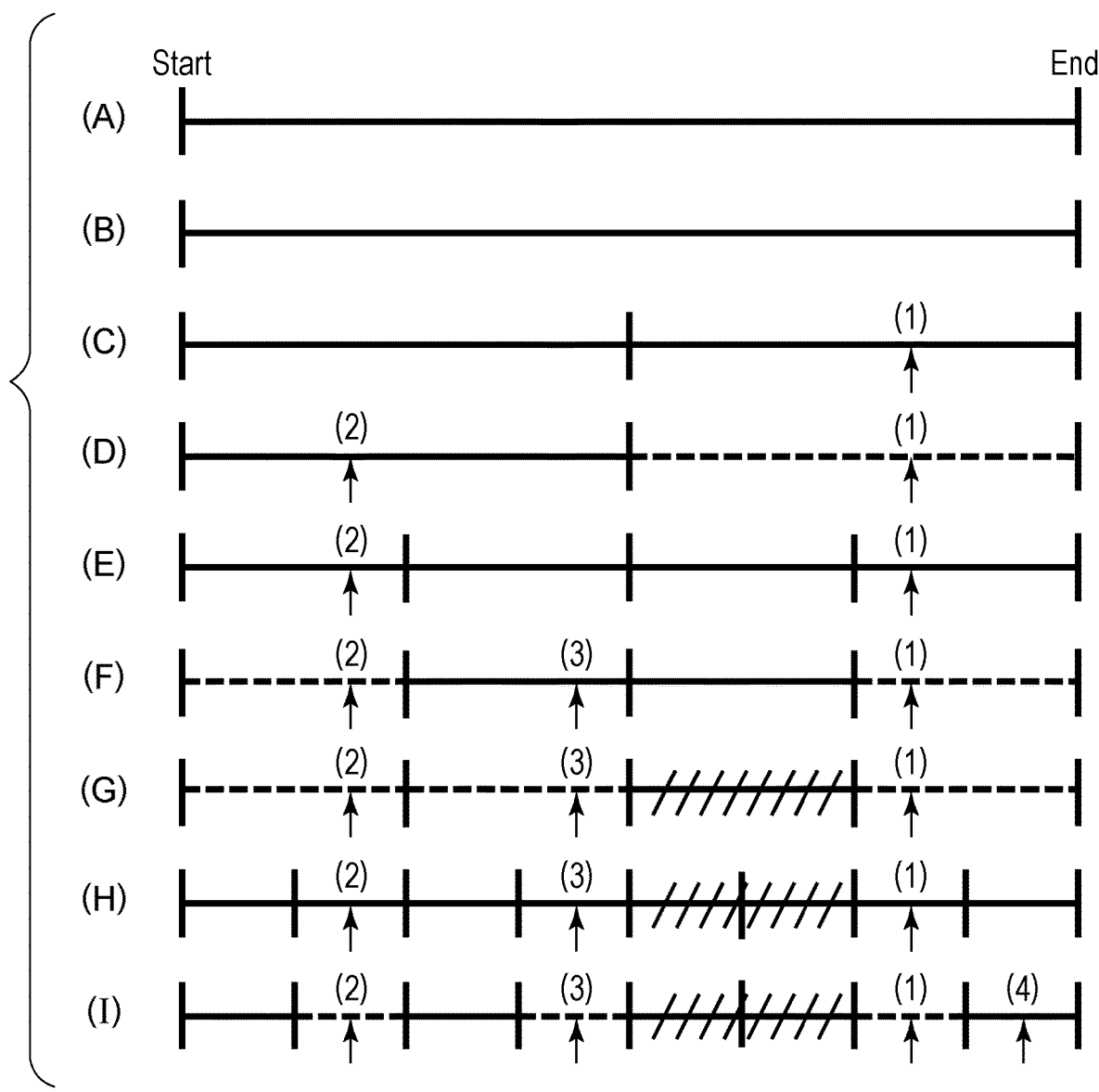
FIG. 9 is a graph illustrating selection of image data according to one or more aspects of the present disclosure.

In S423, the CPU 101 causes the image selection unit 213 to execute image selection processing. An example of selecting four pieces of image data from a grouping image data group allocated to a certain double-page spread will now be described with reference to FIG. 9. The double-page spread is a region corresponding to two pages, while each of the first double-page spread and the last double-page spread is a region corresponding to one page.

FIG. 9(A) illustrates a time difference (divided shooting period) between shooting date/time of image data with the first shooting date/time and image data with the last shooting date/time in the grouping image data group allocated to the double-page spread, in other words, a shooting period for the grouping image data group. In this case, image data is selected in the order of the main slot and sub-slots. Assume herein that the template corresponding to the double-page spread includes one main slot 1002. Accordingly, image data selected as first image data is image data for the main slot. The CPU 101 selects image data (1) with a highest score for the main slot that is added in S416 in the image data corresponding to the divided shooting period illustrated in FIG. 9(B), as the image data for the main slot.

Second and subsequent image data to be selected are image data for the sub-slots. The selection of the second and subsequent image data is performed by a method as described below so as not to concentrate on a part of the divided shooting period. First, as illustrated in FIG. 9(C), the CPU 101 divides the divided shooting period into two groups. Next, as illustrated in FIG. 9(D), the CPU 101 selects second image data from the image data generated during the divided shooting period (period indicated by a solid line in the figure) in which the first image data is not selected. As the second image data, image data (2) with a highest score for the sub-slots in the image data generated during the divided shooting period in which the first image data is not selected is selected. Next, as illustrated in FIG. 9(E), the CPU 101 divides each divided shooting period illustrated in FIG. 9D into two groups. Further, as illustrated in FIG. 9(F), the CPU 101 selects third image data from the image data generated during the divided shooting period (period indicated by a solid line in the figure) in which the first image data and the second image data are not selected. As the third image data, image data (3) with a highest score for the sub-slots in the image data generated during the divided shooting period in which the first image data and the second image data are not selected is selected. As fourth image data, image data with a highest score for the sub-slots in the image data generated during the divided shooting period in which the first, second, and third image data are not selected is selected.

Next, an example in which there is no image generated during the divided shooting period in which the first, second, and third image data are not selected and the fourth image data cannot be selected from the image data generated during the divided shooting period will be described. Assume herein that, as illustrated in FIG. 9(G), there is no image data generated during the divided shooting period (period indicated by oblique lines in the figure) in which image data has not been selected. In this case, the CPU 101 further divides each divided shooting period into two groups as illustrated in FIG. 9(H). Next, as illustrated in FIG. 9(I), the CPU 101 selects the fourth image data from the images generated during a period other than the divided shooting period in which it is recognized that there is no image data generated in the period, and during the divided shooting period (period indicated by a solid line in the figure) in which image data has not been selected. The CPU 101 selects, as the fourth image data, the image data (4) with a highest score for the sub-slots in the image data generated during the divided shooting period.

In S424, the CPU 101 causes the template setting unit 214 to acquire a plurality of templates according to the template information designated from the album creation condition designating unit 201.

In S425, the CPU 101 causes the image layout unit 215 to determine the image layout for the double-page spread to be processed.

In S426, the CPU 101 causes the image correction unit 217 to perform image correction.

In S427, the CPU 101 causes the layout information output unit 218 to create layout information. Specifically, the CPU 101 manages the image data corresponding to each slot on which image correction in S426 is executed in association with each slot of the template selected in S425. The image used herein is an analysis image generated in S407 and is different from the image used in S408 to S418. Further, the CPU 101 generates bitmap data representing images to be laid out on a template. At this time, the CPU 101 scales the images to be laid out according to slot size information and lays out the images.

In S428, it is determined whether the processing in S423 to S427 on all double-page spreads has been finished. When the processing has not been finished (No in S428), the processing returns to S423, and the processing in S423 to S427 is performed on double-page spreads that are not subjected to the processing.

When the automatic layout processing is finished, the CPU 101 displays, based on the created layout information, the layout image in which the images are arranged on a template is displayed on the display 105. At this time, the CPU 101 may display a plurality of layout images for creating one album. The CPU 101 may transmit the created layout information to a printer such as the image forming apparatus 200, and may print the layout images. The layout images are printed to thereby create the album.

In the automatic layout processing described above, the album creation application automatically selects a template or image data (without accepting a selection instruction from the user), and generates the layout images. However, the images indicated by the layout information are not limited to templates and images indicated by image data. This is because, in the present exemplary embodiment, the layout information is used for creating an album, while the album includes regions in which images that are represented by image data are not generally printed and are referred to as, for example, an end leaf or fly leaf, a title page, and a colophon. In the present exemplary embodiment, the layout information indicates images corresponding to an end leaf or fly leaf, a title page, and a colophon. Data representing these images is not generated by the automatic layout processing described above. Accordingly, assume that data created for images corresponding to an end leaf or fly leaf, a title page, and a colophon is included in the layout information at any timing.

In the present exemplary embodiment, the details of the automatic layout processing are not limited to those described above. For example, the method for selecting a template used for an album, or selecting image data representing images to be arranged on the template is not limited to the method described above. Any method may be employed as long as the layout information can be created without the need for the user to execute at least selection of a template used for an album, and selection of image data representing images to be arranged on the template.

<Album Edition>

The CPU 101 creates the layout information as described above, and then displays a screen for accepting edition of an album indicated by the created layout information. On this screen, the user can confirm the content of the album indicated by the layout information created by the automatic layout processing. Accordingly, such a screen is hereinafter referred to as a confirmation screen. In the present exemplary embodiment, one of the plurality of double-page spreads included in the album indicated by the created layout information is displayed on the confirmation screen, and the double-page spread to be displayed is switched according to a user operation. At this time, an album may be displayed on the confirmation screen not in units of double-page spread, but in units of page. The double-page spread displayed on the confirmation screen displayed immediately after the automatic layout processing is finished is not particularly limited. For example, the double-page spread displayed on the confirmation screen may be a first double-page spread in a plurality of double-page spreads, or may be a double-page spread with a highest importance level described below. Assume in the present exemplary embodiment that the double-page spread displayed on the confirmation screen immediately after the automatic layout processing is finished is a first double-page spread (double-page spread with a double-page spread name of "cover") in a plurality of double-page spreads.

Figure 13:
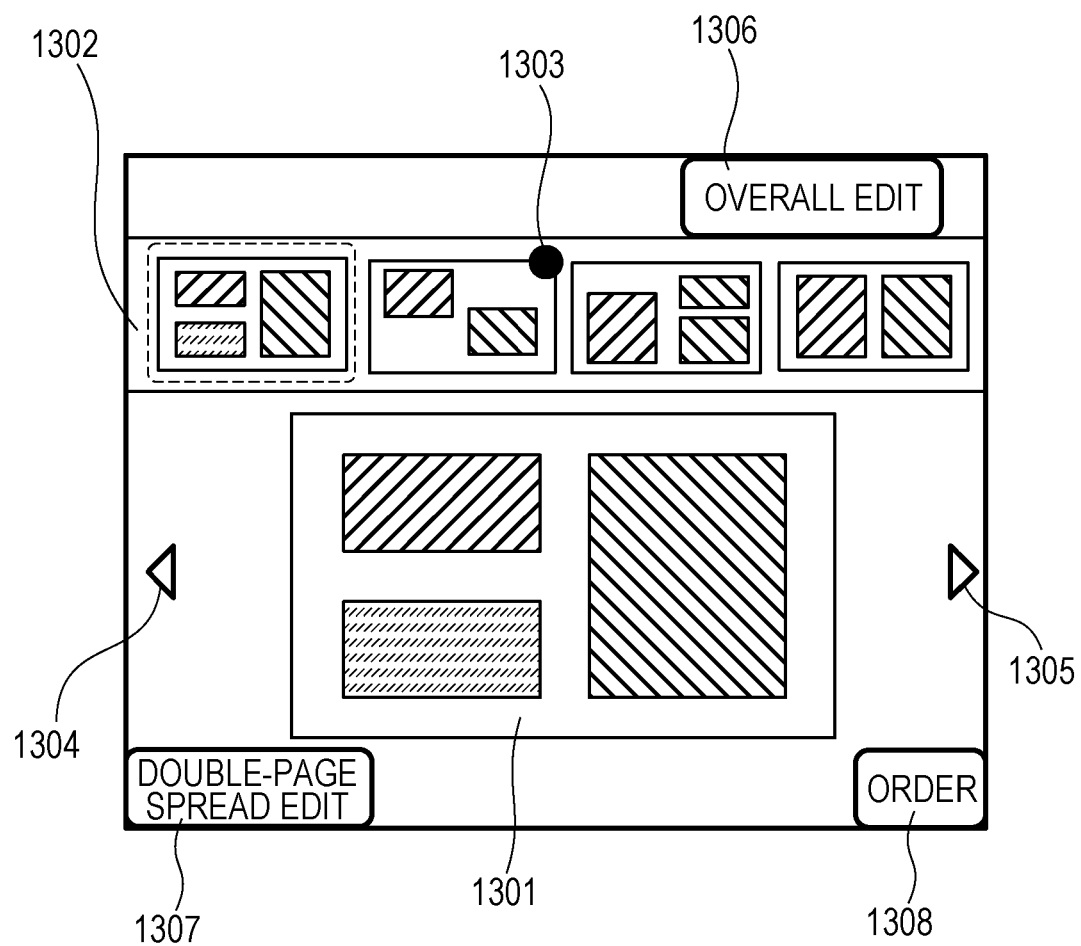
FIG. 13 is a diagram illustrating a confirmation screen according to one or more aspects of the present disclosure.

FIG. 13 illustrates an example of the confirmation screen. A display region 1301 represents one double-page spread. The term "one double-page spread" used herein refers to a region corresponding to two facing pages in an album. In the present exemplary embodiment, one double-page spread corresponds to one template, and thus one template and images arranged on the template are displayed on the display region 1301. The relationship between a cover (front cover) and a back cover does not correspond to the definition of the double-page spread described above. However, in the present exemplary embodiment, the front cover and the back cover are regarded as one double-page spread, and the cover and the back cover are displayed in parallel in the display region 1301. The display region 1301 is not limited to a region representing one double-page spread. For example, the display region 1301 may be a region representing one page. The state of the display region 1301 may be switched between a state representing one double-page spread and a state representing one page. In this case, for example, the display region 1301 is displayed in such a manner that the cover and the back cover are displayed in a state representing one page, and the book body is displayed in a state representing one double-page spread.

A thumbnail region 1302 is a region in which a list of thumbnails corresponding to the double-page spreads of the album is displayed. When the user selects a thumbnail, the double-page spread corresponding to the selected thumbnail is displayed on the display region 1301. In other words, the user can browse the double-page spread corresponding to the selected thumbnail by selecting the thumbnail.

An icon 1303 is an icon indicating that the double-page spread corresponding to the thumbnail is not browsed. Each icon is displayed based on information indicating the browsing state included in the data structure illustrated in FIG. 12. Specifically, an icon is displayed in the thumbnail corresponding to the double-page spread for which the browsing state indicates not-browsed in the data structure illustrated in FIG. 12. Thus, the image processing apparatus 100 according to the present exemplary embodiment adds an icon to the thumbnail corresponding to the double-page spread that is not browsed by the user, thereby making it possible to prompt the user to confirm the not-browsed double-page spread. There is no need to prompt the user to confirm the double-page spreads browsed by the user (browsed double-page spreads), and thus the icon is not displayed.

Double-page spread feed buttons 1304 and 1305 are buttons for switching the double-page spread displayed on the display region 1301. When the double-page spread feed button 1304 is pressed, a double-page spread prior to the double-page spread displayed on the display region 1301 at that time is displayed. When the double-page spread feed button 1305 is pressed, a double-page spread subsequent to the double-page spread displayed on the display region 1301 at that time is displayed. Thus, not only the method of selecting a thumbnail on the thumbnail region 1302, but also the operation of the buttons enables the user to switch the double-page spread to be displayed on the display region 1301.

An album edit button 1306 is a button for changing the setting about the entire album. Specifically, the album edit button 1306 is, for example, a button for changing a background color of the entire album, a font to be used in the entire album, and the like. Alternatively, the album edit button 1306 is, for example, a button for changing the theme or main character of the album, the proportion of images including a designated object to be adopted for the album, and the like, and for executing the automatic layout again. The term "entire album" refers to all double-page spreads or pages included in the album. Specifically, the user can collectively edit and change the entire album by pressing the album edit button 1306. Editing or changing of the entire album is carried out based on information input in an input region, which is not illustrated, on the confirmation screen. For example, when a change in the background color is designated in the input region, which is not illustrated, and the album edit button 1306 is pressed, the album edit application changes the background color of the entire album. When the album edit button 1306 is pressed, a change screen for changing the setting about the entire album may be displayed on the confirmation screen and the entire album may be edited or changed by an input on the displayed screen. The setting about all double-page spreads or pages included in the album need not necessarily be changed by the album edit button 1306, and the setting about at least one double-page spread or page may be changed.

A double-page spread edit button 1307 is a button for changing the setting about the double-page spread displayed on the display region 1301. Specifically, the double-page spread edit button 1307 is, for example, a button for changing a template corresponding to a double-page spread, an image included in a double-page spread, changing an importance level of a double-page spread, and adding or inputting text. The setting about the double-page spread displayed on the display region 1301 is changed based on information input in the input region, which is not illustrated, on the confirmation screen. For example, when a change in the background color in the input region which is not illustrated is designated and the double-page spread edit button 1307 is pressed, the album edit application changes the background color of the double-page spread displayed on the display region 1301. When the double-page spread edit button 1307 is pressed, the change screen for changing the setting about the double-page spread displayed on the display region 1301 is displayed on the confirmation screen, and the double-page spread may be edited or changed by an input on the displayed screen. The setting about the double-page spread displayed on the display region 1301 can also be changed by, for example, directly operating the double-page spread displayed on the display region 1301.

An album order button 1308 is a button for placing an order for an album. When the album order button 1308 is pressed, the layout information in the setting at this time is transmitted to the external server 400, and the album is created based on the layout information.

As described above, the album is created based on the layout information created by the automatic layout processing. When the user confirms the content of the album on the confirmation screen and there is a double-page spread with a low user satisfaction level, the user presses the double-page spread edit button 1307, thereby making it possible to appropriately edit or change the content of the double-page spread. In addition, the user can collectively edit and change the entire album by pressing the album edit button 1306.

However, for example, the user may press the album order button 1308 to give an instruction to place an order for an album, without confirming all the contents of the album. In this case, for example, even when album includes a double-page spread with a low user satisfaction level, the user places an order for the album without editing or changing the content of the album, so that the album with a low user satisfaction level is obtained as an output result.

For example, even in a case where the user temporarily confirms the double-page spreads, the entire album may be edited or changed after that. In such a case, the content of the album is different from the content confirmed by the user. Accordingly, if the double-page spreads are not confirmed by the user even after the entire album is edited or changed, the user may place an order for the album including double-page spreads with a low user satisfaction level.

Accordingly, for example, when the user gives an instruction to place an order for the album in a state where the album includes a double-page spread that is not browsed by the user (not-browsed double-page spread), error processing for preventing an album order instruction from being accepted may be executed. For example, when the user gives an instruction to place an order for the album in a state where the album includes a not-browsed double-page spread, warning processing for asking the user whether to place an order for the album in this state may be executed.

However, the mode in which the above-described error processing or warning processing is executed without taking into consideration the content of the not-browsed double-page spread has a problem that the error processing or warning processing may be executed to request the user to perform a troublesome operation even when the not-browsed double-page spread need not be confirmed by the user.

Accordingly, the present exemplary embodiment illustrates a mode in which whether to execute the error processing or warning processing is switched in consideration of the content of the not-browsed double-page spread.

First, FIG. 12 illustrates an example of data for managing the browsing state of each double-page spread or page included in the album indicated by the created layout information (hereinafter referred to as browsing state management data). FIG. 12 illustrates the browsing state management data at a timing when the confirmation screen is displayed immediately after the automatic layout processing is finished. The browsing state management data according to the present exemplary embodiment includes a region managed for each page and a region managed for each double-page spread. Alternatively, the browsing state management data may be managed for all pages, or may be managed for all double-page spreads.

Figure 25:
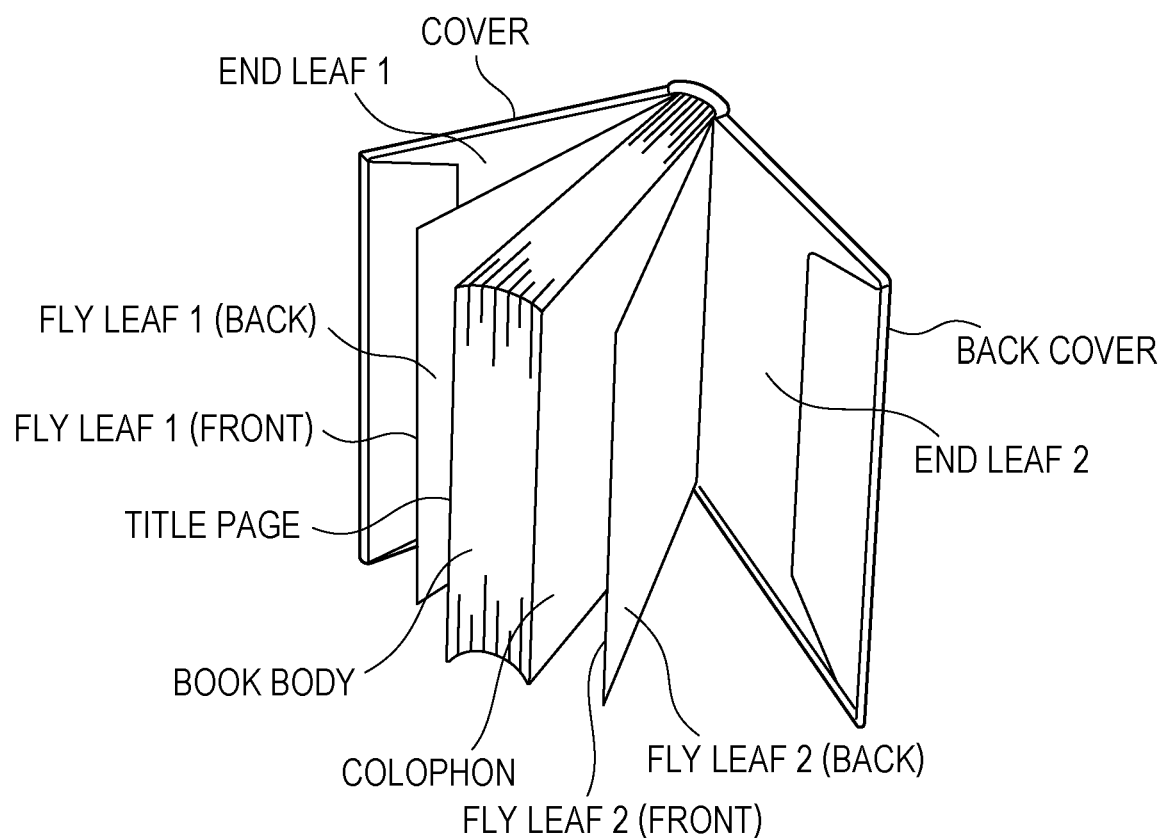
FIG. 25 is a diagram illustrating names of parts of an album according to one or more aspects of the present disclosure.

In the browsing state management data, "name" indicates the name of each double-page spread or each page. The regions of the respective names in the album are illustrated in FIG. 25. The double-page spreads with a name of "page . . . " correspond to the book body of the album.

Further, in the browsing state management data, "importance level" indicates an importance level of each double-page spread or each page. In this case, the importance level indicates a setting value that is preliminarily set by a vendor of the album creation application. A double-page spread or page with a higher importance level indicates the double-page spread or page that need to be confirmed (browsed) by the user after the automatic layout processing. A double-page spread or page with a lower importance level indicates the double-page spread or page that need not necessarily be confirmed (browsed) by the user after the automatic layout processing. The importance level of each double-page spread or each page may be set by the user, or the importance level of each double-page spread or each page preliminarily set by the vendor may be changed by the user.

Further, in the browsing state management data, "browsing state" indicates whether each double-page spread or each page is browsed by the user.

The double-page spread or page with the "browsing state" indicating "not-browsed" indicates that the double-page spread or page is not confirmed and browsed by the user after the automatic layout processing. The double-page spread or page with the "browsing state" indicating "not-browsed" indicates that the double-page spread or page is not confirmed and browsed by the user after editing or changing of the entire album. In other words, the double-page spread or page with the "browsing state" indicating "not-browsed" indicates that the content of the current double-page spread or page after the layout information is generated or changed is not confirmed and browsed by the user. On the other hand, the double-page spread or page with the "browsing state" indicating "browsed" indicates that the double-page spread or page is confirmed and browsed by the user after the automatic layout processing is performed. Alternatively, the double-page spread or page with the "browsing state" indicating "browsed" indicates that the double-page spread or page indicates that the double-page spread or page is confirmed and browsed by the user after the entire album is edited or changed. In other words, the double-page spread or page with the "browsing state" indicating "browsed" indicates that the content of the current double-page spread or page is confirmed and browsed by the user after the layout information is generated or changed.

In the present exemplary embodiment, browsing a certain double-page spread or page indicates displaying the certain double-page spread or page on the display region 1301. Accordingly, for example, when the double-page spread or page that is not displayed on the display region 1301 and is displayed on the thumbnail region 1302, it is regarded that the double-page spread or page is not browsed.

In the present exemplary embodiment, the importance level of the double-page spreads or pages with the name of "cover", "page . . . ", or "back cover" is set to "2". The double-page spreads or pages with the name of "cover", "page . . . ", or "back cover" are double-page spreads or pages that are created by arranging automatically selected images on a template, and corresponds to a main content of the album. The automatically selected images are, for example, images that vary depending on the content of the setting information input to the setting screen illustrated in FIG. 3, and are images represented by the image data automatically selected by the album creation application without receiving a user selection instruction. Specifically, assume in the present exemplary embodiment that the automatically selected images do not include images that are arranged not based on the content of the setting information input to the setting screen illustrated in FIG. 3.

As described above, the double-page spreads or pages include the main content of the album. Accordingly, the user is prompted to confirm whether the content of the album is a content desired by the user by performing the automatic layout processing of the album creation application, or changing the setting about the entire album. Therefore, in the present exemplary embodiment, the importance level of the double-page spreads or pages is set to the maximum value "2". The double-page spreads or pages with the name of "cover", "page . . . ", or "back cover" may include or not include text. Depending on whether the double-page spreads or pages include text, the importance level of the double-page spreads or pages with the name of "cover", "page . . . ", or "back cover" may be set in more detail.

In the present exemplary embodiment, the importance level of the double-page spreads or pages with the name of "title page" or "colophon" is set to "1". The double-page spreads or pages are text images in which the automatically selected images are not arranged, but, for example, text such as the title or editor's postscript of the album, and album creation date/time may be arranged. The content of the double-page spreads or pages has no great influence on the degree of completeness of the entire album. Accordingly, some users may care about the content of the double-page spreads or pages, and other users may not care about the content of the double-page spreads or pages. Therefore, in the present exemplary embodiment, the importance level of the double-page spreads or pages is set to an intermediate value "1".

In the present exemplary embodiment, the importance level of the double-page spreads or pages with the name of "end leaf 1", "fly leaf 1 (front)", "fly leaf 1 (back)", "fly leaf 2 (front)", "fly leaf 2 (back)", or "end leaf 2" is set to "0". These double-page spreads or pages are non-layout images in which the automatically selected images or text are not basically arranged. Accordingly, the double-page spreads or pages do not include any element that can be edited by the user, and thus there is no need for the user to confirm the content of the double-page spreads or pages after the automatic layout processing. Therefore, in the present exemplary embodiment, the importance level of the double-page spreads or pages is set to a minimum value "0".

The importance level set to each double-page spread or page is not limited to the above-described modes. For example, in the present exemplary embodiment, the importance level of the pages with the name of "title page" or "colophon" is set to the intermediate value "1", but instead an importance level other than the intermediate value may be set. For example, the importance level of the pages with the name of "title page" or "colophon" may be set to the maximum value in a mode in which the automatically selected images can be arranged in the title page or colophon, or in an environment in which may users care about the content of the title page or colophon even in a mode in which the automatically selected images cannot be arranged. Further, the importance level of the pages with the name of "title page" or "colophon" may be set to the minimum value in an environment in which only a small number of users care about the content of the text.

In the exemplary embodiment described above, a high importance level is set to the double-page spreads or pages in which images are arranged, while a low importance level is set to the double-page spreads or pages in which no images are arranged. However, instead of setting the importance level based on the presence or absence of images, the importance level may be set based on the presence or absence of the content (image, text, etc.) that varies depending on the content of the setting information input to the setting screen as illustrated in FIG. 3. Accordingly, for example, a high importance level may be set to the double-page spreads or pages in which the automatically selected images are arranged, and a low importance level may be set to the double-page spreads or pages in which images other than the automatically selected images are arranged and the automatically selected images are not arranged. For example, if there is a double-page spread or page in which the automatically selected images are not arranged and text that varies depending on the content of the setting information input to the screen illustrated in FIG. 3 is included, a high importance level may be set to the double-page spread or page.

In view of the above, a mode for switching the processing according to the importance level when an input for placing an order for an album is received from the user in the state where there is a not-browsed double-page spread or page will be described.

Figure 11:
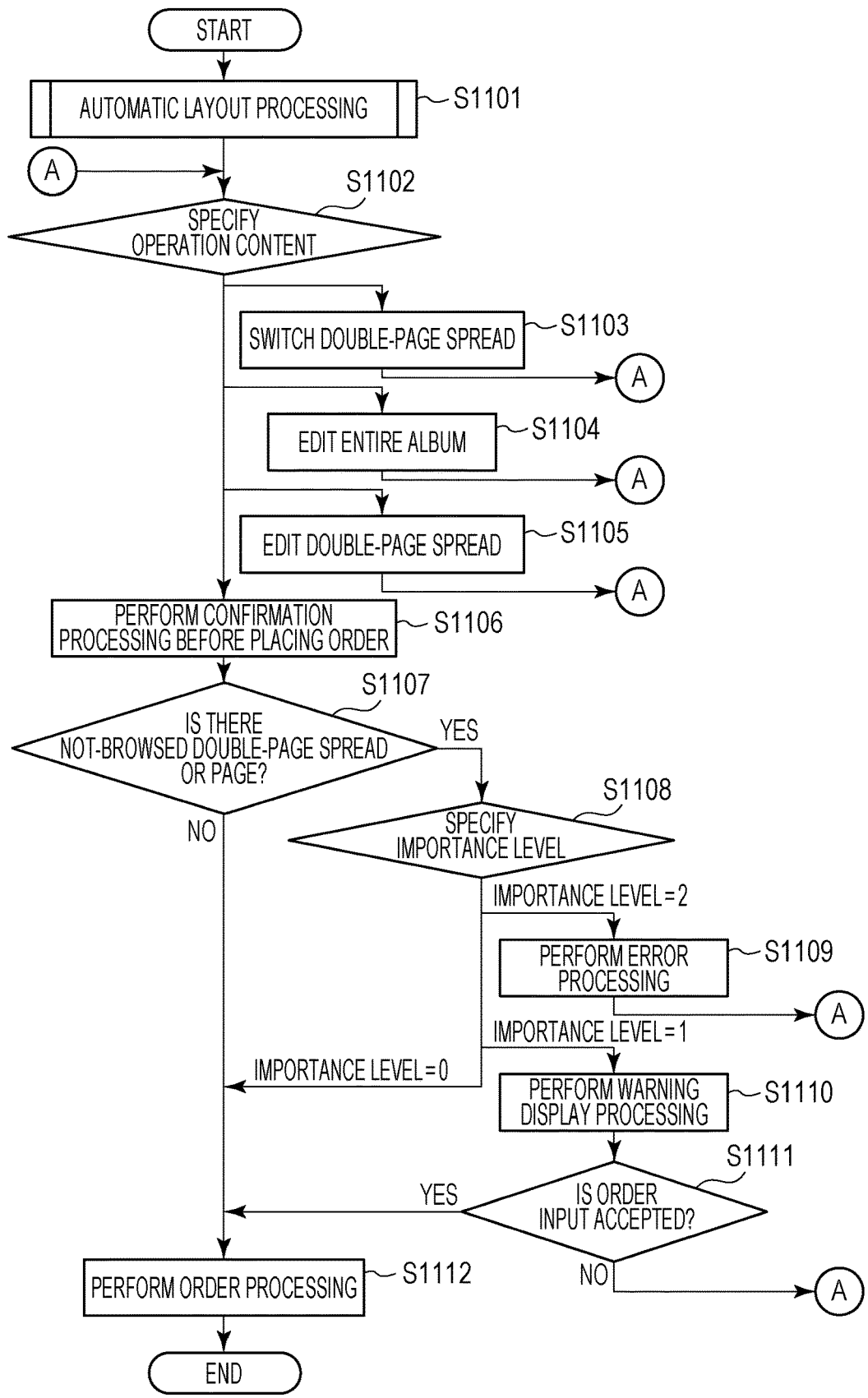
FIG. 11 is a flowchart illustrating processing executed by an image processing apparatus according to one or more aspects of the present disclosure.

FIG. 11 is a flowchart illustrating processing executed by the image processing apparatus 100 according to the present exemplary embodiment. In this flowchart, a series of processing from layout information creation processing to album ordering processing based on the layout information will be described. The flowchart illustrated in FIG. 11 is implemented in such a manner that, for example, the CPU 101 retrieves the program corresponding to the album creation application stored in the HDD 104 into the ROM 102 or RAM 103 and executes the program.

In S1101, the CPU 101 generates layout information by the automatic layout processing. The method for generating the layout information is illustrated in the flowchart of FIGS. 4A and 4B. After generating the layout information, the CPU 101 displays the confirmation screen as illustrated in FIG. 13. As described above, the confirmation screen is a screen for prompting the user to confirm the content of the album based on the generated layout information. At this time, the double-page spreads including a page with the name of "cover" or "back cover" are displayed on the confirmation screen, and thus the browsing state management data is obtained as illustrated in FIG. 12.

Next, in S1102, the CPU 101 accepts the user operation on the confirmation screen illustrated in FIG. 13. Further, the CPU 101 specifies the content of the accepted user operation, and proceeds to the next processing according to the specified content. Specifically, when a thumbnail on the thumbnail region 1302 is selected, or the double-page spread feed buttons 1304 and 1305 are pressed, the CPU 101 proceeds to S1103. When the album edit button 1306 is pressed, the CPU 101 proceeds to S1104, and when the double-page spread edit button 1307 is pressed, the CPU 101 proceeds to S1105. When the album order button 1308 is pressed, the CPU 101 proceeds to S1106.

In S1103, the CPU 101 switches the double-page spread displayed on the display region 1301 to the double-page spread according to the accepted user operation. At this time, the CPU 101 updates the browsing state management data according to the accepted user operation. Specifically, the CPU 101 updates the item about the browsing state of the double-page spread or page according to the accepted user operation with information indicating "browsed". For example, when an operation for displaying the double-page spread corresponding to 1 to 2 pages is accepted from the user immediately after the layout information is automatically generated, the CPU 101 updates the browsing state management data from data illustrated to FIG. 12 to data illustrated FIG. 14. After that, the CPU 101 returns to S1102.

In S1104, the CPU 101 changes the setting about the entire album according to the received input. The CPU 101 appropriately edits and changes the content of the layout information generated in S1101 according to the received input. The setting is changed while the double-page spread is displayed on the display region 1301. However, at this time, the user can confirm only the result of changing the setting about the double-page spread displayed on the display region 1301. Accordingly, when the setting about the entire album is changed, the CPU 101 updates the browsing state management data. Specifically, the CPU 101 switches, to "not-browsed", the item regarding the "browsing state" corresponding to all double-page spreads or pages other than the double-page spread displayed on the display region 1301 when the setting about the entire album is changed. Then, the CPU 101 returns to S1102. In a mode in which when the album edit button 1306 is pressed, the change screen for changing the setting about the entire album is displayed on the confirmation screen, the processing in S1104 is carried out when an input is made on the change screen.

In S1105, the CPU 101 changes a setting about the double-page spread displayed on the display region 1301 according to the received input. The CPU 101 receives, from the user, the input on the double-page spread setting screen, and changes the setting about the double-page spread displayed on the display region 1301. Further, the CPU 101 appropriately edits and changes the content of the layout information generated in S1101 according to the received input. Then, the CPU 101 returns to S1102. At this time, the CPU 101 may change the importance level of the double-page spread according to the received user input. For example, when images are arranged according to the received user input in the double-page spread in which no images are arranged (e.g., the double-page spread including a page corresponding to a title page or a colophon), the CPU 101 may set the importance level of the double-page spread in which images are arranged to the maximum value. Further, for example, when text is arranged according to the received user input in the double-page spread in which neither images nor text is arranged (e.g., the double-page spread including a page corresponding to an end leaf or fly leaf), the CPU 101 may set the importance level of the double-page spread in which images are arranged to the intermediate value. Further, for example, when all images are removed according to the received user input from the double-page spread in which images are arranged (e.g., the double-page spread including a page corresponding to a book body), the CPU 101 may set the importance level of the double-page spread from which images are removed to the intermediate value or minimum value. Since the setting is changed while the double-page spread is displayed on the display region 1301, the setting change result at this time is browsed by the user. Accordingly, the browsing state management data is not updated. In a mode in which, when the double-page spread edit button 1307 is pressed, the change screen for changing the setting about the double-page spread displayed on the display region 1301 is displayed on the confirmation screen, when an input is made on the change screen, the processing in S1103 is carried out.

In S1106, the CPU 101 performs confirmation processing before ordering processing. Specifically, at this time, the CPU 101 confirms that, for example, the image data representing an image which has a low resolution and thus cannot be printed is not included in the layout information. Further, the CPU 101 confirms that, for example, there is no double-page spread formed of a template including a slot in which no images are arranged. When the image data representing an image that has a low resolution and thus cannot be printed is included in the layout information, or when there is a double-page spread that is formed of a template including a slot in which no images are arranged, the CPU 101 may return to S1102. At this time, the CPU 101 may display, on the display 105, a screen for indicating that the layout information includes image data representing an image that has a low resolution and thus cannot be printed, or indicating that there is a double-page spread that is formed of a template including a slot in which no images are arranged.

In S1107, the CPU 101 determines, based on the browsing state management data, whether a not-browsed double-page spread or page is included in a plurality of double-page spreads or pages included in the album for which an order is placed. When the CPU 101 determines that the browsing state management data has a data structure as illustrated in FIG. 12 or FIG. 14 and there is a not-browsed double-page spread or page, the processing proceeds to S1108. On the other hand, when the CPU 101 determines that the browsing state management data has a data structure as illustrated in FIG. 15 and there is no not-browsed double-page spread or page, the processing proceeds to S1112.

In S1108, the CPU 101 specifies which one of the importance levels of the not-browsed double-page spreads or pages is the maximum importance level. For example, when the browsing state management data has a data structure as illustrated in FIG. 14, the maximum importance level is "2". When the CPU 101 determines that the maximum importance level is "0" (when the double-page spreads or pages having the importance levels of "1" and "2" are browsed and the double-page spreads or pages having the importance level of "0" are not browsed), the processing proceeds to ordering processing in S1112 without performing error processing or warning display processing described below. Specifically, when only the pages with the name of "end leaf 1", "fly leaf 1 (front)", "fly leaf 1 (back)", "fly leaf 2 (front)", "fly leaf 2 (back)", or "end leaf 2" are not browsed, the CPU 101 proceeds to the ordering processing in S1112 without performing error processing or warning display processing described below. In such a mode, when the importance level is low and only the double-page spreads or pages that need not be confirmed by the user are not browsed, the confirmation of the not-browsed double-page spreads or pages is omitted, thereby improving the usability. Further, when the CPU 101 determines that the maximum importance level is "1", the processing proceeds to warning display processing in S1110 regardless of whether there is a double-page spread or page having the importance level of less than "1". The case where it is determined that the maximum importance level is "1" is a case where double-page spreads or pages having the importance level of "2" are browsed and double-page spreads or pages having the importance level of "1" are not browsed. Further, when the CPU 101 determines that the maximum importance level is "2" (when the double-page spreads or pages having the importance level of "2" are not browsed), the processing proceeds to error processing in S1109 regardless of whether the double-page spreads or pages having an importance level of less than "2" are not browsed.

Figure 16:
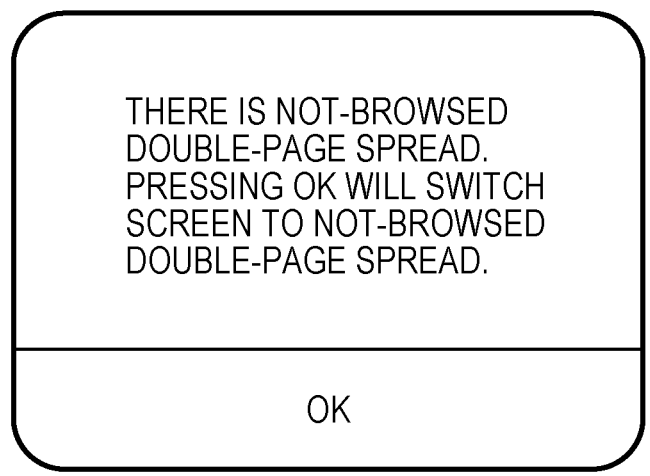
FIG. 16 is a diagram illustrating an error screen according to one or more aspects of the present disclosure.

In S1109, the CPU 101 executes the error processing. Specifically, the CPU 101 displays, for example, an error screen as illustrated in FIG. 16. The error screen includes, for example, a message indicating that there is a not-browsed double-page spread or page. When the OK button on the error screen is pressed, the CPU 101 returns to S1102. Specifically, the CPU 101 does not proceed to the ordering processing until the double-page spreads or pages having the importance level of "2" are browsed, and displays the confirmation screen again. At this time, when the OK button is pressed on the error screen, the CPU 101 may switch the screen displayed on the display 105 to the confirmation screen including the display region 1301 in which the not-browsed double-page spreads or pages are displayed. When there is a plurality of not-browsed double-page spreads or pages, the CPU 101 may, for example, switch the screen to the confirmation screen including the display region 1301 in which the first double-page spread or page in the not-browsed double-page spreads or pages is displayed. Further, the CPU 101 may switch the screen to the confirmation screen including the display region 1301 in which the double-page spread or page having the highest importance level in the not-browsed double-page spreads or pages is displayed. Further, the CPU 101 may cause the user to select one of the not-browsed double-page spreads or pages, and may switch the screen to the confirmation screen including the display region 1301 in which the selected double-page spread or page is displayed.

The processing in S1109 is executed when the importance level of the not-browsed double-page spreads or pages is the maximum importance level of "2". As described above, in the mode in which the user performs confirmation processing and ordering processing is not performed until the double-page spreads or pages having a high importance level are browsed, it is possible to prevent ordering processing for an album with a low user satisfaction level from being executed before the user performs confirmation processing.

Figure 17:
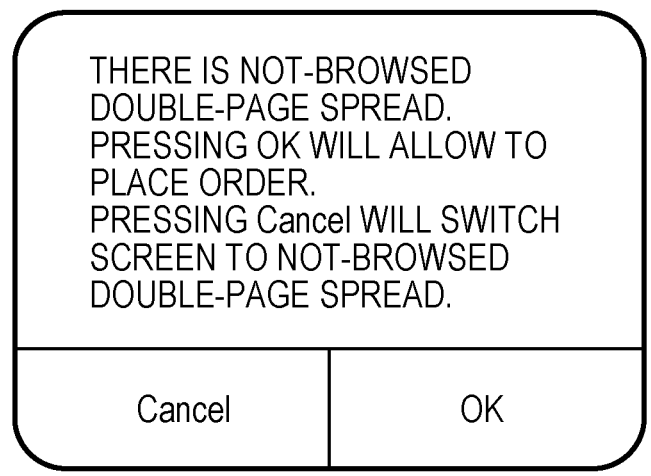
FIG. 17 is a diagram illustrating a warning screen according to one or more aspects of the present disclosure.

In S1110, the CPU 101 executes the warning display processing. Specifically, the CPU 101 displays, for example, a warning screen as illustrated in FIG. 17. The warning screen includes, for example, a region for receiving, from the user, an input indicating whether to execute album ordering processing in a state where there is a not-browsed double-page spread or page. The warning screen includes, for example, a message indicating that there is a not-browsed double-page spread or page, and a message for notifying that the screen displayed on the display 105 is switched to the confirmation screen including the display region 1301 in which the not-browsed double-page spread or page is displayed.

Next, in S1111, the CPU 101 determines whether an input indicating that the album ordering processing is executed has been received from the user. When the OK button on the warning screen is pressed, the CPU 101 determines that the input indicating that the album ordering processing is executed has been received from the user, and the processing proceeds to the ordering processing in S1112. On the other hand, when a cancel button on the warning screen is pressed, the CPU 101 determines that the input which does not indicate that the album ordering processing is executed has been received from the user, and the processing returns to S1102 instead of proceeding to the ordering processing in S1112. At this time, when the cancel button on the warning screen is pressed, the CPU 101 may switch the screen displayed on the display 105 to the confirmation screen including the display region 1301 in which the not-browsed double-page spread or page is displayed. When there is a plurality of not-browsed double-page spreads or pages, the CPU 101 may, for example, switch the screen to the confirmation screen including the display region 1301 in which the first double-page spread in the not-browsed double-page spreads or pages is displayed. Further, the CPU 101 may switch the screen to the confirmation screen including the display region 1301 in which the double-page spread or page having the highest importance level in the not-browsed double-page spreads or pages is displayed. Furthermore, the CPU 101 may cause the user to select one of the not-browsed double-page spreads or pages, and may switch the screen to the confirmation screen including the display region 1301 in which the selected double-page spread or page is displayed.

Thus, when the maximum importance level of the not-browsed double-page spread or page is "1", the CPU 101 confirms to the user whether to execute the album ordering processing without directly proceeding to the album ordering processing. Then, when it is confirmed that the album ordering processing is executed, the CPU 101 proceeds to the album ordering processing, and when it is not confirmed that the album ordering processing is executed, the CPU 101 displays the screen (confirmation screen) for browsing the double-page spread or page. As described above, it is considered that the double-page spreads or pages having the importance level of "1" are double-page spreads or pages in which no images are arranged, and that some users care about the content of the double-page spreads or pages, or other users do not care about the content of the double-page spreads or pages. In the present exemplary embodiment, the CPU 101 confirms the user whether to execute the album ordering processing as described above, and executes the processing according to the confirmation result, thereby allowing the user to select desired processing.

In S1112, the CPU 101 executes the ordering processing. Specifically, the CPU 101 transmits the generated layout information to the external server 400 via the network 300. The layout information transmitted at this time may be edited in S1104 and S1105. The layout information transmitted at this time includes information about a template to be used for an album, and image data representing images to be arranged on the template. When the layout information is transmitted to the external server 400, the image forming apparatus 500 connected to the external server 400 performs printing based on the layout information, thereby creating an album.

In this manner, when the importance level is set to each double-page spread or each page included in the album, and when an album ordering instruction is received from the user, the processing is switched according to the importance level set to the not-browsed double-page spread or page, thereby improving the convenience of the user. Specifically, when the importance level set to the not-browsed double-page spread or page, the error processing or warning display processing is executed, thereby preventing ordering processing for an album with a low user satisfaction level from being executed before the album content is confirmed by the user. When the importance level set to the not-browsed double-page spread or page is low, the confirmation of the album content by the user can be omitted without executing the error processing or warning display processing.

Second Exemplary Embodiment

A mode in which one album can be edited by a plurality of users in cooperation and processing to be performed when an album ordering instruction is made is executed in consideration of the browsing state of each user will be described.

Figure 18:
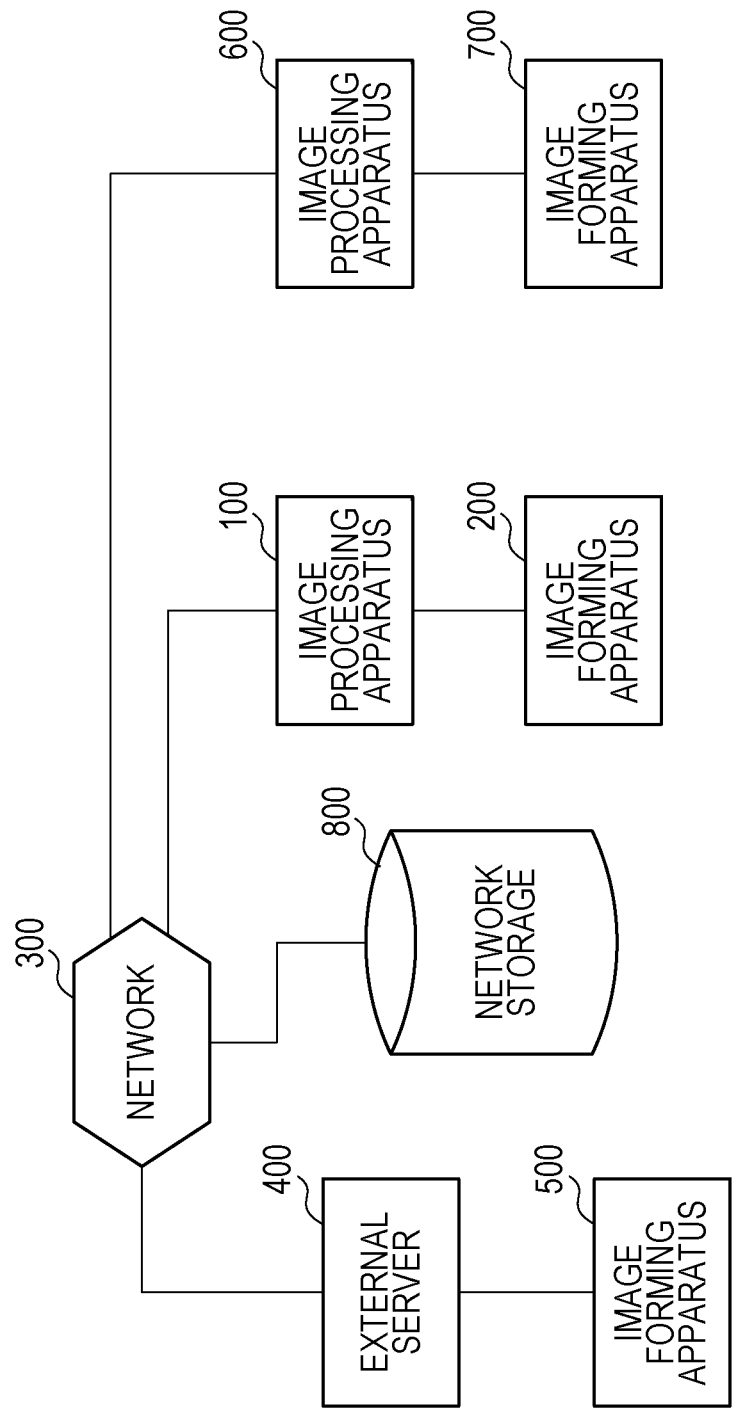
FIG. 18 is a diagram illustrating a configuration of a print system according to one or more aspects of the present disclosure.

FIG. 18 illustrates a print system according to the present exemplary embodiment. In the print system according to the present exemplary embodiment, the image processing apparatus 100, the image forming apparatus 200, the network 300, the external server 400, and the image forming apparatus 500 are similar to those described in the first exemplary embodiment. Assume that the image processing apparatus 100 is an apparatus that is operated by a user A. An image processing apparatus 600 is an apparatus having a configuration similar to that of the image processing apparatus 100. Assume that the image processing apparatus 600 is an apparatus that is operated by a user B. An image forming apparatus 700 is an apparatus having a configuration similar to that of the image forming apparatus 200, and is connected to the image processing apparatus 600. A network storage 800 is a storage capable of accepting an access from the image processing apparatus 100 and the image processing apparatus 600 via the network 300. The image processing apparatus 100 and the image processing apparatus 600 upload data necessary for the automatic layout processing or album edit processing by the album creation application into the network storage 800, or downloads the data from the network storage 800.

In this case, the mode in which a plurality of users edits an album by using a plurality of images processing apparatuses is illustrated. However, the present disclosure is not limited to this mode. For example, a mode in which an album is edited by a plurality of users using one image processing apparatus may be employed.

Figure 19:
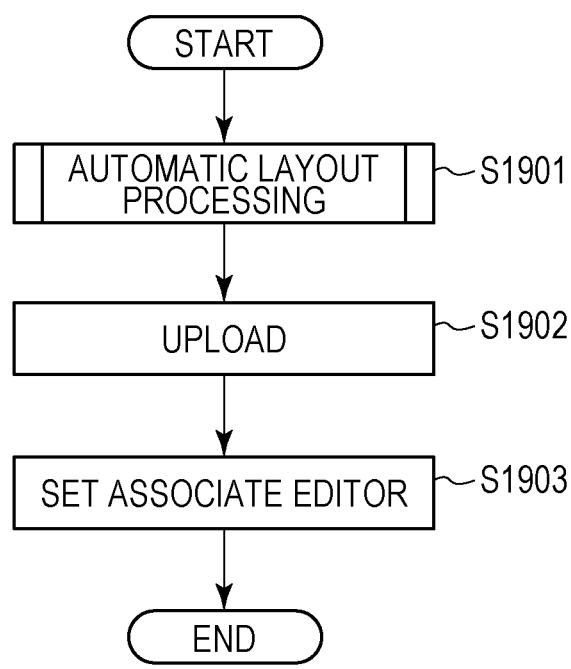
FIG. 19 is a flowchart illustrating processing executed by the image processing apparatus according to one or more aspects of the present disclosure.

FIG. 19 is a flowchart illustrating processing executed by the image processing apparatus 100 according to the present exemplary embodiment. In this flowchart, a series of processing from layout information creation processing to processing for uploading the layout information into the network storage 800 will be described. The flowchart illustrated in FIG. 19 is implemented in such a manner that, for example, the CPU 101 retrieves a program corresponding to the album creation application stored in the HDD 104 into the ROM 102 or RAM 103 and executes the program.

In S1901, the CPU 101 accepts an operation from the user A and generates layout information by automatic layout processing. The method for generating the layout information is illustrated in the flowcharts of FIGS. 4A and 4B in the first exemplary embodiment.

In S1902, the CPU 101 uploads the layout information generated in S1901 into the network storage 800 by accepting the operation from the user A. By this processing, the user B can download the layout information from the network storage 800 by using the image processing apparatus 600 and browse and edit the album based on the layout information generated by the user A. The CPU 101 may automatically upload the layout information generated in S1901 into the network storage 800 without accepting an operation from the user A. In this case, the user A causes the image processing apparatus 100 to generate and update the layout information, but instead the user B may cause the image processing apparatus 600 to generate and upload the layout information.

In S1903, the CPU 101 performs processing for setting a user (associate editor) capable of editing and changing the layout information generated in S1901. Specifically, for example, the CPU 101 transmits a URL used for editing and changing the layout information generated in S1901 to the user, who is set as an associate editor, via an e-mail, a chat system, or the like. Further, for example, CPU 101 uploads information about an account corresponding to the user to be set as an associate editor into the network storage 800. As a result, only the user to be set as an associate editor is set to be able to download the layout information generated in S1901 or edit and change the layout information. Setting of the associate editor is not required to be performed at this time. For example, setting of the associate editor may be performed during the album edit/change processing, or may be performed before the automatic layout processing is performed.

Figure 20:
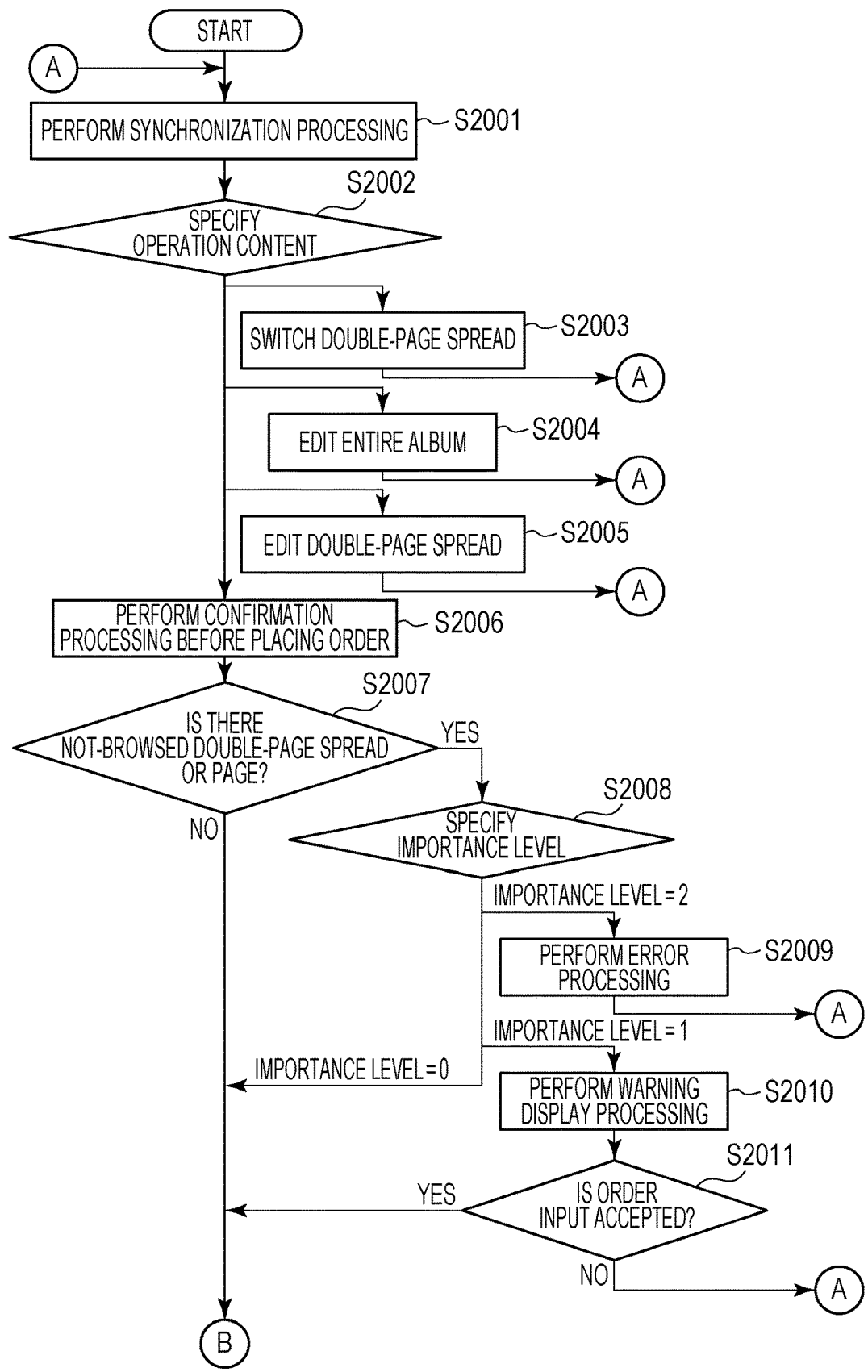
FIG. 20 is a flowchart illustrating processing executed by the image processing apparatus according to one or more aspects of the present disclosure.

FIG. 20 is a flowchart illustrating each processing executed by the image processing apparatus 100 accepting an operation from the user A. The flowchart illustrated in FIG. 20 is implemented in such a manner that, for example, the CPU 101 retrieves the program corresponding to the album creation application stored in the HDD 104 into the ROM 102 or RAM 103 and executes the program.

In S2001, the CPU 101 performs synchronization processing on the layout information. The synchronization processing is processing for uploading, to the network storage 800, the layout information edited or changed by the operation of the user A and browsing management data. The synchronization processing is processing for downloading, from the network storage 800, the layout information edited or changed by the operation of the associate editor or the browsing management data. By the synchronization processing, the latest editing result or browsing state can be shared with the associate editor.

FIG. 23 illustrates an example of the browsing management data according to the present exemplary embodiment. In the present exemplary embodiment, the browsing state and importance level of each double-page spread or each page is managed for each user capable of editing and changing the layout information generated by the processing illustrated in FIG. 19. The double-page spread or page with the browsing management state of the user A indicating "not-browsed" indicates that the double-page spread or page is not browsed by the user A. The double-page spread or page with the browsing management state of the user B indicating "not-browsed" indicates that the double-page spread or page is not browsed by the user B. FIG. 23 illustrates the browsing management data at a timing when the confirmation screen is displayed after the layout information is generated by the user A. Accordingly, the browsing management data indicates that only the pages of "display" and "back cover" that are displayed first on the confirmation screen are browsed by the user A and none of the double-page spreads or pages are browsed by the user B.

Next, in S2002, the CPU 101 accepts a user operation on the confirmation screen illustrated in FIG. 13. Further, the CPU 101 specifies the content of the accepted user operation, and proceeds to the next processing according to the specified content. Specifically, when a thumbnail on the thumbnail region 1302 is selected or the double-page spread feed buttons 1304 and 1305 are pressed, the CPU 101 proceeds to S2003. Further, when the album edit button 1306 is pressed, the CPU 101 proceeds to S2004, and when the double-page spread edit button 1307 is pressed, the CPU 101 proceeds to S2005. When the album order button 1308 is pressed, the CPU 101 proceeds to the flowchart illustrated in FIG. 21.

In S2003, the CPU 101 switches the double-page spread displayed on the display region 1301 to the double-page spread corresponding to the operation accepted from the user A. At this time, the CPU 101 updates the item regarding the user A in the browsing state management data according to the operation accepted from the user A. Specifically, the CPU 101 updates the item regarding the browsing state of the double-page spread or page corresponding to the operation accepted from the user A with the information indicating "browsed".

In S2004, the CPU 101 changes the setting about the entire album according to a received input. Further, according to the received input, the CPU 101 appropriately edits and changes the content of the layout information generated in S1901. Furthermore, when the setting about the entire album is changed, the CPU 101 updates the browsing state management data. Specifically, when the setting about the entire album is changed, the CPU 101 switches the item for the browsing state regarding the user A on all double-page spreads or pages other than the double-page spread displayed on the display region 1301 to "not-browsed". Further, the CPU 101 switches the item for the browsing state on all double-page spreads or pages regarding all associate editors other than the user A to "not-browsed". Then, the CPU 101 returns to S2001.

In S2005, the CPU 101 changes the setting about the double-page spread displayed on the display region 1301 according to the received input. The CPU 101 receives the input on the double-page spread setting screen from the user, thereby changing the setting about the double-page spread displayed on the display region 1301. Further, the CPU 101 appropriately edits and changes the content of the layout information generated in S1101 according to the received input. In the present exemplary embodiment, the item regarding the user A in the browsing state management data is not updated, but the item for the browsing state of the double-page spread or page displayed on the display region 1301 about all associate editors other than the user A is switched to "not-browsed". Then, the CPU 101 returns to S2001. At this time, the CPU 101 may change the importance level of the double-page spread according to the input received from the user, like in S1105 of the first exemplary embodiment.

The processing of S2006 is similar to the processing of S1106, and thus the description thereof is omitted.

In S2007, the CPU 101 determines, based on the browsing state management data, whether a plurality of double-page spreads or pages indicated by the layout information includes a double-page spread or page that is not browsed by the user (user A) who operates the image processing apparatus 100. When the CPU 101 determines that there is a double-page spread or page that is not browsed by the user A, the processing proceeds to S2008. On the other hand, when the CPU 101 determines that there is no double-page spread or page that is not browsed by the user A, the processing proceeds to the flowchart illustrated in FIG. 21.

In S2008, the CPU 101 specifies which one of the importance levels of the double-page spreads or pages that are not browsed by the user (user A) who operates the image processing apparatus 100 is the maximum importance level. When the CPU 101 determines that the maximum importance level is "0", the processing proceeds to the flowchart of FIG. 21 instead of proceeding to the error processing or warning display processing. When the CPU 101 determines that the maximum importance level is "1", the processing proceeds to the warning display processing in S2010. When the CPU 101 determines that the maximum importance level is "2", the processing proceeds to the error processing in S2009.

The error processing in S2009, the warning display processing in S2010, and the processing in S2011 are respectively similar to the error processing in S1109, the warning display processing in S1110, and the processing in S1111, and thus descriptions thereof are omitted.

In the mode as described above, the user (user A) who operates the image processing apparatus 100 can switch the processing according to the importance level set to the not-browsed double-page spreads or pages.

Figure 21:
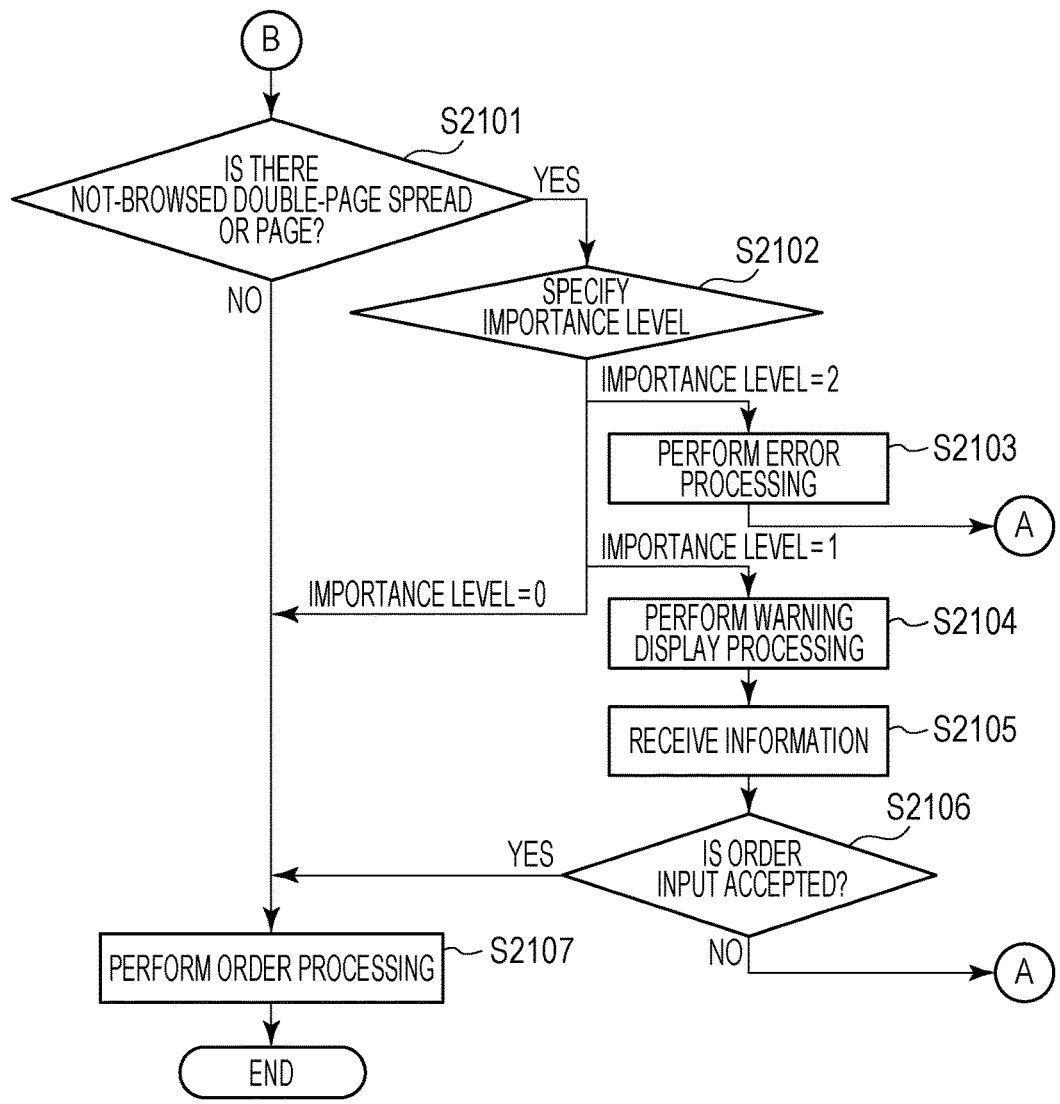
FIG. 21 is a flowcharts illustrating processing executed by the image processing apparatus according to one or more aspects of the present disclosure.

FIG. 21 is a flowchart illustrating each processing executed by the image processing apparatus 100 accepting an operation from the user A. The flowchart illustrated in FIG. 21 is implemented in such a manner that, for example, the CPU 101 retrieves the program corresponding to the album creation application stored in the HDD 104 into the ROM 102 or RAM 103 and executes the program.

In S2101, the CPU 101 determines, based on the browsing state management data, whether the plurality of double-page spreads or pages indicated by the layout information includes a double-page spread or page that is not browsed by the associate editor (user B). When the CPU 101 determines that there is a double-page spread or page that is not browsed by the user B, the processing proceeds to S2102. On the other hand, when the CPU 101 determines that there is no double-page spread or page that is not browsed by the user B, the processing proceeds to the ordering processing in S2017. Thus, in the present exemplary embodiment, the ordering processing is performed not only by the user who operates the image processing apparatus 100, but also by the album associate editors, when there is no not-browsed double-page spread or page. For example, when there are associate editors other than the user B, the CPU 101 confirms the browsing state of each of the associate editors other than the user B, and determines, based on the browsing state management data, whether there is a double-page spread or page that is not browsed by any one of the associate editors.

In S2102, the CPU 101 specifies which one of the importance levels of double-page spreads or pages that are not browsed by the associate editor (user B) is the maximum importance level. When the CPU 101 determines that the maximum importance level is "0", the processing proceeds to the ordering processing in S2107 instead of proceeding to the error processing or warning display processing. When the CPU 101 determines that the maximum importance level is the processing proceeds to the warning display processing in S2104. When the CPU 101 determines that the maximum importance level is "2", the processing proceeds to the error processing in S2103.

In S2103, the CPU 101 executes the error processing. Specifically, the CPU 101 displays, for example, the error screen as illustrated in FIG. 26. The error screen includes, for example, a notification message indicating that there is a double-page spread or page that is not browsed by the associate editor. When the OK button on the error screen is pressed, the CPU 101 requests and asks the associate editor to browse the not-browsed double-page spread or page. Specifically, the CPU 101 transmits, via an e-mail, a chat system, or the like, information for requesting and asking the associate editor to browse the not-browsed double-page spread or page to the image processing apparatus (image processing apparatus 600) operated by the associate editor. Specifically, the CPU 101 does not proceed to the ordering processing until the double-page spread or page having the importance level of "2" is browsed by the associate editor. After that, the CPU 101 returns to S2001. In such a mode, it is possible to prevent album ordering processing from being executed in a state where the content of the album is not confirmed by the associate editor.

In S2104, the CPU 101 executes the warning display processing. Specifically, the CPU 101 displays, for example, the warning screen as illustrated in FIG. 27. The warning screen includes, for example, a notification message indicating that there is a double-page spread or page that is not browsed by the associate editor. The warning screen also includes, for example, information indicating that an input indicating whether to execute the album ordering processing in a state where there is a double-page spread or page that is not browsed by the associate editor is received from the associate editor. When the OK button on the error screen is pressed, the CPU 101 executes processing for inquiring the associate editor whether to execute the album ordering processing in the state where there is a double-page spread or page that is not browsed by the associate editor. Specifically, the CPU 101 transmits, to the image processing apparatus operated by the associate editor, information for inquiring the associate editor whether to execute the album ordering processing in a state where there is a double-page spread or page that is not browsed by the associate editor, via an e-mail, a chat system, or the like.

In S2105, the CPU 101 receives, from the image processing apparatus operated by the associate editor, information indicating whether to execute the album ordering processing in the state where there is a double-page spread or page that is not browsed by the associate editor.

In S2105, the CPU 101 determines whether the received information indicates that the album ordering may be executed. When the received information indicates that the album ordering processing may be executed, the CPU 101 proceeds to the ordering processing in S2017. On the other hand, when the received information does not indicate that the album ordering processing may be executed, the CPU 101 returns to S2001 without proceeding to the ordering processing in S2017.

When the information indicating whether to execute the album ordering processing in the state where there is a double-page spread or page that is not browsed by the associate editor has not been received for a certain period of time or longer, the CPU 101 may proceed to the ordering processing in S2017.

In this manner, when the maximum importance level in the importance levels of the double-page spreads or pages that are not browsed by the associated editor is "1", the CPU 101 confirms to the associate editor whether to execute the album ordering processing without directly proceeding to the album ordering processing. When it is confirmed that the album ordering processing is executed, the CPU 101 proceeds to the album ordering processing. When it is not confirmed that the album ordering processing is executed, the CPU 101 does not proceed to the album ordering processing until the double-page spread or page is browsed by the associate editor or it is confirmed that the album ordering processing is executed. In the present exemplary embodiment, as described above, the CPU 101 confirms to the associate editor whether to execute the album ordering processing and executes the processing according to the confirmation result, thereby making it possible to execute processing desired by the associate editor.

In S2107, the CPU 101 executes the ordering processing. S2107 is similar to S1112, and thus the description thereof is omitted.

Figure 22:
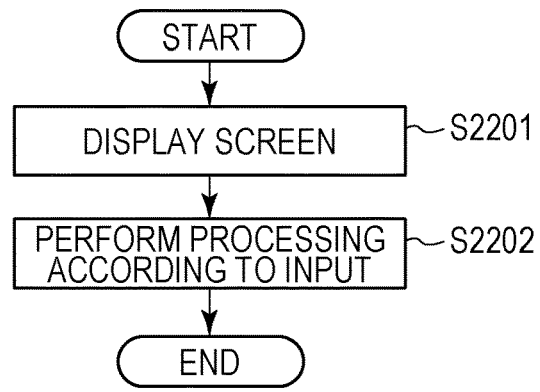
FIG. 22 is a flowchart illustrating processing executed by the image processing apparatus according to one or more aspects of the present disclosure.

FIG. 22 is a flowchart illustrating each processing executed by the image processing apparatus 600 accepting an operation from the user B. The flowchart illustrated in FIG. 22 is implemented in such a manner that, for example, the CPU 101 retrieves the program corresponding to the album creation application stored in the HDD 104 into the ROM 102 or RAM 103 and executes the program. Assume that this flowchart is started when the information transmitted from the image processing apparatus 100 is received in S2103 or S2104.

In S2201, the CPU 101 displays, on the display 105 included in the image processing apparatus 600, a screen based on the information transmitted from the image processing apparatus 100 in S2103 or S2104. Specifically, when the received information is the information transmitted from the image processing apparatus 100 in S2103, the CPU 101 displays, on the display 105, a screen indicating that a double-page spread or page that is not browsed by the user B is requested to be browsed. When the received information is the information transmitted from the image processing apparatus 100 in S2104, the CPU 101 displays, on the display 105, a screen indicating whether to execute the album ordering processing in the state where there is a double-page spread or page that is not browsed by the user B.

In S2202, the CPU 101 receives, from the user B, an input on the screen displayed in S2201. Specifically, for example, when the screen indicating that the user B is requested to browse the not-browsed double-page spread or page is displayed in S2201, the CPU 101 receives, from the user B, an input for displaying the confirmation screen including the double-page spread or page that is not browsed by the user B. Upon receiving the input, the CPU 101 displays the confirmation screen including the double-page spread or page that is not browsed by the user B. This allows the double-page spread or page that is not browsed by the user B to be switched to the double-page spread or page that is browsed by the user B. At this time, the CPU 101 may transmit, to the image processing apparatus 100, information indicating that the double-page spread or page that is not browsed by the user B is browsed by the user B.

For example, when the screen indicating whether to execute the album ordering processing in the state where there is a double-page spread or page that is not browsed by the user B is displayed in S2201, the CPU 101 receives, from the user B, an input indicating whether to execute the album ordering processing. Upon receiving the input, the CPU 101 transmits, to the image processing apparatus 100, information indicating whether to execute the album ordering processing according to the received input. When an input indicating that the album ordering may be executed is made, the CPU 101 may switch all items about the browsing state of each double-page spread or page regarding the user B in the browsing state management data to "browsed".

Thus, in the present exemplary embodiment, when the album associate editor is set, processing is performed in consideration of not only the double-page spread or page that is not browsed by the user who operates the image processing apparatus 100, but also the double-page spread or page that is not browsed by the album associate editor. In such a mode, it is possible to improve the convenience not only for the user who operates the image processing apparatus 100, but also for the associate editor.

The setting of the importance level can be changed in the double-page spread edit processing in S2005. At this time, the user can change the setting of information about the user in the browsing state management data. For example, when the user sets a low importance level to the double-page spreads or pages including only images that do not include an image of the user, an operation for confirming the double-page spreads or pages can be omitted even when another user edits the double-page spreads or pages. For example, when the user sets a high importance level to the double-page spreads or pages including an image of the user, the ordering processing can be performed after confirming the double-page spreads or pages when another user edits the double-page spreads or pages.

FIG. 23 illustrates an example in which the importance level set to each double-page spread or each page regarding the user A is the same as the importance level set to each double-page spread or each page regarding the user B. However, the present disclosure is not limited to this mode. For example, among the importance levels set to the double-page spreads or pages regarding the user A, the importance level set to the double-page spreads or pages in which images including the user A are not arranged may be set to a low level. Similarly, among the importance levels set to double-page spreads or pages regarding the user A, the importance level set to the double-page spreads or pages in which images including the user B are arranged may be set to a high level.

The present exemplary embodiment illustrates a case where the album associate editors are set. However, for example, the CPU 101 may replace the processing according to the first exemplary embodiment with the processing according to the second exemplary embodiment depending on whether the album associate editors are set. Specifically, for example, when the album order button 1308 is pressed, the CPU 101 determines whether associate editors are set for the album for which an order is placed. When the CPU 101 determines that associate editors are set, the processing in S1106 to S1112 is carried out. Further, when the CPU 101 determines that no associate editors are set, the processing in S2006 to S2011 and S2101 to S2106 is carried out.

In the present exemplary embodiment, control is performed in such a manner that the album ordering processing is prevented from being executed in the state where there is a double-page spread that is not browsed by the associate editor and there is a double-page spread with a high importance level. However, the present disclosure is not limited to this mode. For example, when an ordering instruction is received, a screen indicating that there is a double-page spread that is not browsed by the associate editors and inquiring whether to continue the ordering processing may be displayed. When an input indicating that the ordering processing is continued is received, an order for an album may be placed, and when an input indicating that the ordering processing is not continued is received, an order for an album may not be placed.

Other Exemplary Embodiment

The exemplary embodiments described above illustrates the image processing apparatus 100 that switches whether to perform the error processing or warning display processing according to the importance level of not-browsed double-page spreads or pages when the album ordering instruction based on the layout information is received from the user. However, the present disclosure is not limited to this mode. For example, when an instruction for causing the image forming apparatus 200 to perform printing based on the layout information is received from the user, the image processing apparatus 100 may switch whether to perform the error processing or warning display processing according to the importance level of not-browsed double-page spreads or pages. Further, for example, when an instruction for transmitting the layout information to another image processing apparatus via the network 300 is received from the user, whether to perform the error processing or warning display processing may be switched according to the importance level of not-browsed double-page spreads or pages. Furthermore, for example, when an instruction for uploading the layout information to an SNS server via the network 300 is received from the user, whether to perform the error processing or warning display processing may be switched according to the importance level of not-browsed double-page spreads or pages. That is, the present disclosure can be applied to any mode as long as transmission processing for the layout information can be performed. Thus, it is possible to prevent, for example, a printed material with a low user satisfaction level from being obtained as an output result, or prevent an image with a low user satisfaction level from being displayed on an external display unit as an output result.

In the exemplary embodiments described above, a message indicating that there is an image that is not browsed is displayed when the album ordering instruction based on the layout information is received from the user. However, the present disclosure is not limited to this mode. For example, the message indicating that there is an image that is not browsed may be displayed before the album ordering instruction based on the layout information is received from the user.

In the exemplary embodiments described above, when the importance level of not-browsed double-page spreads or pages is high, the error screen is displayed as error processing, or the confirmation screen is displayed again without proceeding to the ordering processing. However, the present disclosure is not limited to this mode. For example, when the importance level of not-browsed double-page spreads or pages is high, the album order button 1308 may be grayed out to prevent the album order button 1308 from being pressed. In such a mode, it is possible to execute the control for preventing the ordering processing from being executed when the importance level of not-browsed double-page spreads or pages is high.

In the exemplary embodiments described above, three importance levels are set for not-browsed double-page spreads or pages. When the album ordering instruction based on the layout information is received from the user in the state where there is a not-browsed double-page spread or page, and one of the error processing, warning display processing, and ordering processing is executed according to the importance level of the not-browsed double-page spread or page. However, the present disclosure is not limited to this mode. For example, two importance levels may be set for not-browsed double-page spreads or pages and one of the error processing and ordering processing may be executed according to the importance level of the not-browsed double-page spreads or pages. Further, for example, in a manner similar to that as described above, two importance levels may be set for not-browsed double-page spreads or pages and one of the warning display processing and ordering processing may be executed according to the importance level of the not-browsed double-page spreads or pages.

The layout information used for creating an album is output in the exemplary embodiments described above. However, the information to be output is not limited to this mode. That is, the information to be output need not necessarily be used for creating an album, and any information indicating a plurality of images such as a plurality of double-page spreads or pages may be used.

In the exemplary embodiments described above, the layout information is generated by the automatic layout processing. However, the present disclosure is not limited to this mode. For example, the layout information may be generated in such a manner that the user manually selects a template and manually selects images to be arranged on the template. In such a mode, all images indicated by the layout information are browsed by the user when the layout information is generated. However, for example, when the edit processing for the entire album is performed after the layout information is generated, the ordering processing may be executed in the state where the edited images are not browsed by the user. To solve this problem, the present disclosure can also be applied to a mode in which the layout information manually generated is output.

The present disclosure can also be implemented by processing in which a program for implementing one or more functions according to the exemplary embodiments described above is supplied to a system or apparatus via a network or a recording medium, and one or more processors in a computer of the system or apparatus read and execute the program. The present disclosure can also be implemented by a circuit (for example, ASIC) for implementing one or more functions.

It is possible to improve the usability in outputting layout information, while preventing an acquisition of an output result with a low user satisfaction level.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-016207, filed Jan. 31, 2017, which is hereby incorporated by reference herein in its entirety.

What is claimed is:

1. A control method for an image processing apparatus to process layout information for creating an album,
wherein a plurality of pages including a layout page, which includes at least one selected image selected by a user, and a non-layout page, which includes neither text nor the selected image, are represented by the layout information, and
wherein the album is created with the plurality of pages represented by the layout information,
the control method comprising:
displaying at least one of the plurality of pages in a predetermined display region on a display included in the image processing apparatus;
based on receiving a user operation, switching the page displayed in the predetermined display region to another page among the plurality of pages;
in a case where any of the plurality of pages displayable in the predetermined display region has never been displayed in the predetermined display region, based on whether the page that has never been displayed in the predetermined display region among the plurality of pages displayable in the predetermined display region is the layout page or the non-layout page, determining whether or not to display, on a display unit, a message indicating that the page that has never been displayed in the predetermined display region is present, wherein display processing for displaying, on the display unit, the message indicating that the page that has never been displayed in the predetermined display region is present in the plurality of pages is not executed based on that at least one non-layout page in the plurality of pages displayable in the predetermined display region has never been displayed in the predetermined display region and every layout page in the plurality of pages displayable in the predetermined display region has ever been displayed in the predetermined display region, and the display processing is executed based on that at least one layout page in the plurality of pages displayable in the predetermined display region has never been displayed in the predetermined display region; and executing output processing for performing outputting based on, when the message is displayed, the layout information according to a user operation after the message is displayed.

2. The control method according to claim 1, wherein when the at least one layout page in the plurality of pages displayable in the predetermined display region has never been displayed in the predetermined display region, the every layout page is displayed in the predetermined display region and the output processing is executed according to a user operation after the message is displayed.

3. The control method according to claim 1, wherein when the at least one layout page in the plurality of pages displayable in the predetermined display region has never been displayed in the predetermined display region, a region for receiving an input indicating whether to execute the output processing is displayed, and the output processing is executed when the input indicating that the output processing is executed is received, and the output processing is not executed when the input indicating that the output processing is executed is not received.

4. The control method according to claim 1, wherein the plurality of pages include a text page, which is a page that includes text and does not include the selected image, wherein the display processing is not executed when at least one text page in the plurality of pages displayable in the predetermined display region has never been displayed in the predetermined display region and the every layout page in the plurality of pages displayable in the predetermined display region has been displayed in the predetermined display region.

5. The control method according to claim 1, wherein the plurality of pages include a text page, which is a page that includes text and does not include the selected image, wherein the display processing is executed when at least one text page in the plurality of pages displayable in the predetermined display region has never been displayed in the predetermined display region and the every layout page and every non-layout page in the plurality of pages displayable in the predetermined display region have been displayed in the predetermined display region.

6. The control method according to claim 5, wherein when the at least one text page in the plurality of pages displayable in the predetermined display region has never been displayed in the predetermined display region, and the every layout page and every non-layout page in the plurality of pages displayable in the predetermined display region have been displayed in the predetermined display region, every text page is displayed in a predetermined display region, and the output processing is executed according to a user operation after the message is displayed.

7. The control method according to claim 5, wherein a region for receiving an input indicating whether to execute the output processing is displayed when at least one text page in the plurality of pages displayable in the predetermined display region has never been displayed in the predetermined display region and the every layout page and every non-layout page in the plurality of pages displayable in the predetermined display region have been displayed in the predetermined display region, and the output processing is executed when the input indicating that the output processing is executed is received, and the output processing is not executed when the input indicating that the output processing is executed is not received.

8. The control method according to claim 1, further comprising:

setting a predetermined user and other user who is not the predetermined user as an associate editor capable of editing the layout information; and wherein, even if the every layout page in the plurality of pages displayable in the predetermined display region has been displayed in the predetermined display region based on receiving the user operation by the predetermined user, in a case where at least one layout page in the plurality of pages displayable in the predetermined display region has never been displayed in the predetermined display region based on receiving the user operation by the other user, a notification message indicating that there is a page that is not browsed by the other user is displayed on the display unit, and wherein, in a case where the every layout page in the plurality of pages displayable in the predetermined display region has been displayed in the predetermined display region based on receiving the user operation by the predetermined user, where the every layout page in the plurality of pages displayable in the predetermined display region has been displayed in the predetermined display region based on receiving the user operation by the other user, and where at least one non-layout page in the plurality of pages displayable in the predetermined display region has never been displayed in the predetermined display region based on receiving the user operation by the other user, the notification message is not displayed on the display unit.

9. The control method according to claim 8, wherein in a case where the predetermined user and the other user are set as the associate editor and the at least one layout page in the plurality of pages displayable in the predetermined display region has never been displayed in the predetermined display region based on receiving the user operation by the other user, the output processing is executed after the every layout page in the plurality of pages displayable in the predetermined display region has been displayed in the predetermined display region based on receiving the user operation by the other user.

10. The control method according to claim 8, wherein in a case where the predetermined user and the other user are set as the associate editor and the at least one layout page in the plurality of pages displayable in the predetermined display region has never been displayed in the predetermined display region based on receiving the user operation by the other user, information for requesting the other user to browse the layout page is transmitted to an outside of the image processing apparatus.

11. The control method according to claim 1, wherein the layout page includes both text and the selected image.

12. The control method according to claim 1, wherein the layout page does not include text and includes the selected image.

13. The control method according to claim 1, further comprising:
a first selection step of automatically selecting at least one template from a plurality of templates without receiving a selection instruction from a user; and
a second selection step of automatically selecting at least one piece of image data from a plurality of pieces of image data without receiving a selection instruction from a user,
wherein the layout page is a page in which the selected image represented by the automatically selected image data is arranged on the selected template.

14. The control method according to claim 1, wherein the output processing is at least one of processing for placing an order for an album based on the layout information, processing for printing an image based on the layout information, and processing for uploading the layout information to an external server.

15. The control method according to claim 1, wherein
the selected image is an image represented by image data automatically selected from a plurality of pieces of image data based on an input of setting information received from a user, and
the selected image is an image that varies depending on a content of the setting information.

16. The control method according to claim 15, wherein the setting information is at least one of information for setting image data representing an image as a candidate for the selected image, information for setting an object included in the selected image, and information for setting the number of selected images and the number of images included in the plurality of pages.

17. The control method according to claim 1, wherein the pages are double-page spread pages of the album.

18. The control method according to claim 1,
wherein the layout page is a cover of the album, a back cover of the album, or a book body of the album, and
wherein the non-layout page is an end leaf of the album or a fly leaf of the album.

19. The control method according to claim 1,
wherein the plurality of pages include a text page, which is a page that includes the text and does not include the selected image,
wherein the display processing and an area display processing, which is processing for displaying an area for executing the output processing while the at least one of the plurality of pages displayable in the predetermined display region remains never having been displayed in the predetermined display region, are not executed in a case where at least one non-layout page in the plurality of pages displayable in the predetermined display region has never been displayed in the predetermined display region and every layout page in the plurality of pages displayable in the predetermined display region and every text page have ever been displayed in the predetermined display region,
wherein the display processing and the area display processing are executed in a case where at least one text page in the plurality of pages displayable in the predetermined display region has never been displayed in the predetermined display region and every layout page in the plurality of pages displayable in the predetermined display region has ever been displayed in the predetermined display region,
wherein the display processing is executed but the area display processing is not executed in a case where at least one layout page in the plurality of pages displayable in the predetermined display region has never been displayed in the predetermined display region.

20. The control method according to claim 19,
wherein, in a case where any of the plurality of pages displayable in the predetermined display region has never been displayed in the predetermined display region, based on whether the page that has never been displayed in the predetermined display region among the plurality of pages displayable in the predetermined display region is the layout page, the non-layout page, or the text page, it is determined whether or not to execute the area display processing.

21. The control method according to claim 19,
wherein processing for displaying an area for displaying the predetermined display region in which the layout page is displayed is executed in a case where at least one layout page in the plurality of pages displayable in the predetermined display region has never been displayed in the predetermined display region.

22. A control method for controlling an image processing apparatus configured to process layout information for creating an album,
wherein a plurality of pages include a layout page, which includes at least a content that varies depending on a content of setting information received from a user, and a non-layout image, which does not include the content, and
wherein the album is created with the plurality of pages represented by the layout information,
the control method comprising:
displaying at least one of the plurality of pages in a predetermined display region on a display included in the image processing apparatus;
based on receiving a user operation, switching the page displayed in the predetermined display region to another page among the plurality of pages;
in a case where any of the plurality of pages displayable in the predetermined display region has never been displayed in the predetermined display region, based on whether the page that has never been displayed in the predetermined display region among the plurality of pages displayable in the predetermined display region is the layout page or the non-layout page, determining whether or not to display, on a display unit, a message indicating that the page that has never been displayed in the predetermined display region is present, wherein
display processing for displaying, on the display unit, the message indicating that the page that has never been displayed in the predetermined display region is present in the plurality of pages is not executed based on that at least one non-layout page in the plurality of pages displayable in the predetermined display region has never been displayed in the predetermined display region and every layout page in the plurality of pages displayable in the predetermined display region has ever been displayed in the predetermined display region, and the display processing is executed based on that at least one layout page in the plurality of pages displayable in the predetermined display region has never been displayed in the predetermined display region; and executing output processing for performing outputting based on, when the message is displayed, the layout information according to a user operation after the message is displayed.

23. The control method according to claim 22, further comprising:

automatically selecting at least one template from a plurality of templates without receiving a selection instruction from a user; and automatically selecting at least one piece of image data from a plurality of pieces of image data without receiving a selection instruction from a user, wherein the layout page is a page in which the content represented by the selected image data is arranged on the selected template.

\* \* \* \* \*